(12) United States Patent
Nogi et al.

(10) Patent No.: US 8,148,485 B2
(45) Date of Patent: Apr. 3, 2012

(54) PRODUCTION METHOD FOR WATER-ABSORBING RESIN

(75) Inventors: Kozo Nogi, Himeji (JP); Kunihiko Ishizaki, Himeji (JP); Koji Matsumoto, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/922,203

(22) PCT Filed: Mar. 13, 2009

(86) PCT No.: PCT/JP2009/054903
§ 371 (c)(1),
(2), (4) Date: Sep. 13, 2010

(87) PCT Pub. No.: WO2009/113672
PCT Pub. Date: Sep. 17, 2009

(65) Prior Publication Data
US 2011/0003926 A1    Jan. 6, 2011

(30) Foreign Application Priority Data

| Mar. 13, 2008 | (JP) | 2008-064408 |
| Mar. 28, 2008 | (JP) | 2008-088072 |
| Apr. 25, 2008 | (JP) | 2008-115446 |
| Apr. 25, 2008 | (JP) | 2008-115751 |
| Jul. 18, 2008 | (JP) | 2008-187904 |
| Sep. 18, 2008 | (JP) | 2008-238918 |

(51) Int. Cl.
*C08F 20/06* (2006.01)
(52) U.S. Cl. ............ 526/317.1; 526/318.2; 526/223
(58) Field of Classification Search .......... 526/317.1, 526/318.2, 223
See application file for complete search history.

(56) References Cited

U.S. PATENT DOCUMENTS

| 4,985,518 A | 1/1991 | Alexander et al. | |
| 6,727,345 B2 * | 4/2004 | Kajikawa et al. | 528/502 R |
| 6,817,557 B2 | 11/2004 | Kakita et al. | |
| 7,193,006 B2 * | 3/2007 | Ishizaki et al. | 524/500 |
| 7,312,278 B2 * | 12/2007 | Nakashima et al. | 525/119 |
| 2003/0020199 A1 | 1/2003 | Kajikawa et al. | |
| 2007/0225160 A1 | 9/2007 | Kitano et al. | |
| 2008/0004408 A1 | 1/2008 | Stueven et al. | |
| 2008/0194863 A1 | 8/2008 | Weismantel et al. | |
| 2008/0227932 A1 | 9/2008 | Funk et al. | |
| 2009/0221746 A1 | 9/2009 | de Marco et al. | |

FOREIGN PATENT DOCUMENTS

| JP | 5-046795 | 6/1993 |
| JP | 63-076684 | 5/1998 |
| JP | 2003-082107 | 3/2003 |
| JP | 2004/018084 | 1/2004 |
| JP | 2004-197087 | 7/2004 |
| JP | 2008/230665 | 10/2008 |

OTHER PUBLICATIONS

CD-ROM of the specification and drawings annexed to the request of Japanese Utility Model Application No. 97069-1991 (Laid-open No. 46795/1993), Tokyo Gas Co., Ltd., Jun. 22, 1993.
Microfilm of the specification and drawings annexed to the request of Japanese Utility Model Application No. 170318/1986 (Laid-open No. 76684-1988), Mitsubishi Heavy Industries, Ltd., May 21, 1988.
S. Ding, S. R. De Silva, G. G. Enstad: "Effect of passive inserts on the granular flow from silos using numerical solutions", Particulate Science and Technology, vol. 21, Dec. 31, 2003, pp. 211-226, XP009153630.

* cited by examiner

*Primary Examiner* — Ling-Siu Choi
(74) *Attorney, Agent, or Firm* — Occhiuti Rohlicek & Tsao LLP

(57) ABSTRACT

In obtaining a water-absorbing resin with high property in high productivity, produced a production method for a water-absorbing resin in high property and stably. Provided is a production method for a water-absorbing resin, comprising: a step for polymerizing an acrylic acid aqueous solution; a step for drying the resultant water-containing gel; a step for pulverizing and classifying the dried substance; and a step for surface cross-linking after classification, wherein a hopper having an inclination angle of a cone part of equal to or larger than 45 degree, and a drawing rate of 30 to 80% is used.

21 Claims, 1 Drawing Sheet

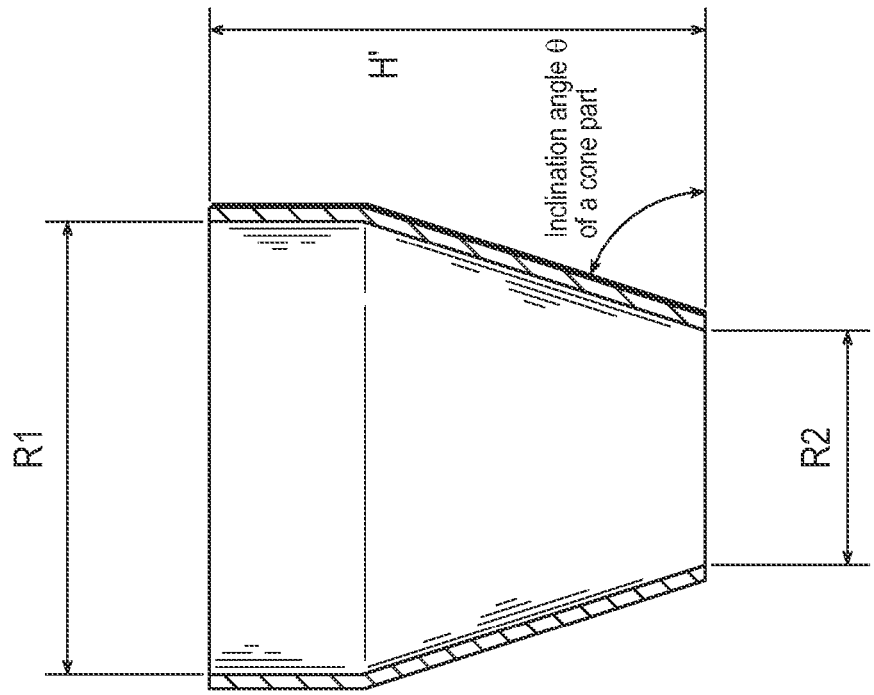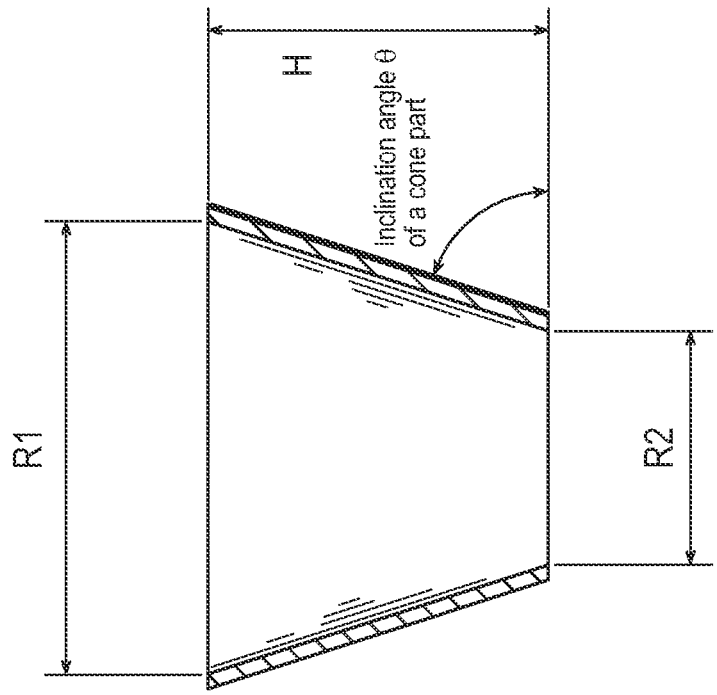

PRODUCTION METHOD FOR WATER-ABSORBING RESIN

CROSS REFERENCE TO RELATED APPLICATIONS

This application is a National Stage of International Application No. PCT/JP2009/054903, filed on Mar. 13, 2009, which claims the priority of Japanese Application No. 2008-064408 filed Mar. 13, 2008, Japanese Application No. 2008-088072 filed Mar. 28, 2008, Japanese Application No. 2008-115446 filed Apr. 25, 2008, Japanese Application No. 2008-115751 filed Apr. 25, 2008, Japanese Application No. 2008-187904 filed Jul. 18, 2008, and Japanese Application No. 2008-238918 filed Sep. 18, 2008. The contents of the prior applications mentioned above are incorporated herein by reference in its entirety.

TECHNICAL FIELD

The present invention relates to a production method for a water-absorbing resin, and a hopper to be used for the same, and in more detail, the present invention relates to a continuous production method for a surface cross-linked water-absorbing resin powder, including a polymerization step, a drying step, a pulverization step, a classification step, and a surface cross-linking step, and a production method for continuously producing stably the water-absorbing resin with high function and high property (such as absorbency against pressure, liquid permeation or the like), and a hopper to be used for the same.

BACKGROUND ART

In recent years, in hygiene materials such as disposable diapers and sanitary napkins, what is called incontinent pads, the water-absorbing resin as a composition material thereof has been widely used, aiming at absorbing body liquid. As such a water-absorbing resin, for example, there have been known a cross-linked product of partially neutralized polyacrylic acid, a hydrolysate of a starch-acrylic acid graft polymer, a saponified product of a vinyl acetate-acrylate ester copolymer, a hydrolysate of an acrylonitrile copolymer or an acrylamide copolymer or a cross-linked product thereof, and a cross-linked polymer of a cationic monomer and the like.

As property required for these water-absorbing resin powders, accompanying with high functionalization of disposable diapers, which are principal applications, many properties have been required, such as, not only absorbency against non-pressure (CRC) and soluble components ("Extractables") as conventional fundamental properties, but also absorbency against pressure (AAP), water-absorbing speed (FSR/Vortex), liquid permeation, suction force, coloring prevention characteristics (whiteness after production and in time course), residual monomers, urine resistance, powder substance fluidity and the like, as well as level thereof has ever become higher.

Accompanying with multi-functionalization and tendency to higher performance of the water-absorbing resin, there has been tendency that many steps are added to a conventional production step of the water-absorbing resin, such as the surface cross-linking step or an addition step of various kinds of additives. Therefore, due to incorporating a plurality of steps complicatedly, it has become increasingly difficult to produce the water-absorbing resin with multi-function and high performance in a large industrial scale.

Accordingly, as compared with a conventional production process of the water-absorbing resin, decrease or deflection (variation width relative to desired property value) of property, or a product out of specification (product out of specification in property) is generated, accompanying with scale up, and there was also a case of generating a problem of not only property decrease but also cost up or environmental load with disposal. This tendency has become more remarkable with expansion of production scale of the water-absorbing resin per one apparatus, in ever expanding demand of the water-absorbing resin in recent years.

Therefore, there have been proposed the following Patent Documents 1 to 11, in producing the water-absorbing resin with high property, and in high productivity.

In order to attain high property and high production amount, the following methods have been proposed: A method for controlling neutralization of acrylic acid, which is a raw material of the water-absorbing resin (Patent Documents 1, 2), a method relating to a specified amount of inhibitor in the polymerization step and operation control of a polymerization apparatus (Patent Document 3), a method for adding a water-soluble inorganic base in surface cross-linking the water-absorbing resin (Patent Document 4), a method for using two or more hoppers in a production line of the water-absorbing resin (Patent Document 5), a method for controlling residual monomers by each particle size of the water-absorbing resin by adding an aqueous solution of a sulfur-containing reducing agent (Patent Document 6), a method for polymerization in two polymerization systems (polymerization lines) of the same method and producing in the last half of the production step (the drying step or the like) in one line (Patent Document 7), a method for removing the water-absorbing resin with equal to or higher or lower than predetermined property, and returning it to the production step for mixing (Patent Document 8) and the like.

In addition, in order to suppress aggregation in the production step, there have been proposed a method for heating or retaining heat of an apparatus in a step of storage, pulverization, transportation or the like (Patent Document 9), a method for performing polymerization and drying at the same time by heat of polymerization (Patent Document 10) and the like.

Other than these, a method for using pneumatic transportation for uniform mixing of inorganic powders such as silica fine particles into the water-absorbing resin (Patent Document 11) has been known as well.

However, even by these methods, it was not able to suppress decrease or deflection of property and generation of a product out of specifications sufficiently, accompanying with production scale up of the water-absorbing resin (in particular, production of equal to or higher than 100 Kg/hr), and in addition there was the case of significant decrease in productivity accompanying with complication of the steps. In particular, in a conventional production method, in producing in a production scale of equal to or higher than 100 kg, still more equal to or higher than 500 kg, and in particular, equal to or higher than 1 ton per one hour, variation width (deflection width) of property by each lot became large, and for example, in sampling the water-absorbing resin by each 1 hour, or in sampling by each production amount of 100 kg or 1 ton in the production line for property evaluation, there was the case where a product out of specifications was produced.

PRIOR DOCUMENTS

Patent Documents

Patent Document 1: WO 2007/28747 pamphlet
Patent Document 2: WO 2007/28751 pamphlet
Patent Document 3: WO 2006/34806 pamphlet
Patent Document 4: WO 2002/100451 pamphlet Patent Document 5: U.S. Pat. No. 6,727,345
Patent Document 6: EP-A-1426157
Patent Document 7: WO 2007/023097 pamphlet
Patent Document 8: U.S. Pat. No. 7,193,006
Patent Document 9: U.S. Pat. No. 6,817,557
Patent Document 10: U.S. Pat. No. 4,985,518
Patent Document 11: US-A-2007-0225160

DISCLOSURE OF THE INVENTION

Problem to be Solved by the Invention

That is, it is an object of the present invention to produce the water-absorbing resin with high property, in high productivity, by suppressing decrease or deflection of property and generation of a product out of specifications, accompanying with scale up (in particular, production of equal to or higher than 100 Kg/hr), in the production method for the multi-functionalized water-absorbing resin with high property.

Means for Solving the Problem

The present invention provides a production method for a water-absorbing resin, comprising: polymerizing an acrylic acid aqueous solution to obtain a water-containing gel (the polymerization step); drying the water-containing gel to obtain a dried substance (the drying step); pulverizing and classifying the dried substance to obtain a powder substance (the pulverization and classification step); and surface cross-linking the powder substance (the surface cross-linking step), wherein at and after the drying step, after storing the dried substance or the powder substance in a hopper having an inclination angle of a cone part of equal to or larger than 45 degree, and a drawing rate of 30 to 80%, at least one or more places, the dried substance or the powder substance is discharged.

ADVANTAGES OF THE INVENTION

Production of the multi-functionalized water-absorbing resin with high property can be attained, where high absorption characteristics is maintained and property variation width by each lot is small and stable, in producing the water-absorbing resin in a rate of equal to or higher than 100 kg, still more equal to or higher than 500 kg, and in particular, equal to or higher than 1 ton (metric ton) per 1 hour.

BRIEF DESCRIPTION OF THE DRAWINGS

FIG. 1 is a schematic view showing maximum caliber part (R1) of the upper part of a hopper, caliber (R2) and height (H) of the discharging part of the hopper, specifying inclination angle and drawing rate of a cone part, and ratio of maximum caliber (diameter) and height of the hopper, relating to the hopper of the present invention.

MODE FOR CARRYING OUT THE INVENTION

The present invention is a production method for the water-absorbing resin, in particular, a polyacrylic acid (salt)-based water-absorbing resin, comprising: polymerizing an acrylic acid aqueous solution to obtain a water-containing gel (the polymerization step); drying the water-containing gel to obtain a dried substance (the drying step); pulverizing and classifying the dried substance to obtain a powder substance (the pulverization and classification step); and surface cross-linking the powder substance (the surface cross-linking step), wherein at and after the drying step, after storing the dried substance or the powder substance in a hopper having an inclination angle of a cone part of equal to or larger than 45 degree, and a drawing rate of 30 to 80%, at least one or more places, the dried substance or the powder substance is discharged.

Explanation will be given below in still more detail on the present invention.

(1) Definition Of Terms (a) The "Water-absorbing Resin"

In the present description, the "water-absorbing resin" means a water swelling and water insoluble polymer gelling agent, and one having an absorbency (CRC) of essentially equal to or higher than 5 g/g, preferably 10 to 100 g/g, and further preferably 20 to 80 g/g, and in addition, water soluble components ("Extractable") of essentially 0 to 50% by weight, preferably 0 to 30% by weight, further preferably 0 to 20% by weight, and particularly preferably 0 to 10% by weight.

It should be noted that, the water-absorbing resin is not limited to a form where whole amount (100%) is a polymer, and may include additives (to be described later or the like), in a range to maintain the above performance. That is, even for a water-absorbing resin composition, it is called generically the water-absorbing resin in the present invention. When the water-absorbing resin is the water-absorbing resin composition in the present invention, content of the water-absorbing resin (a polyacrylic acid (salt)-based water-absorbing resin) relevant to the present invention is preferably 70 to 99.9% by weight, more preferably 80 to 99.7% by weight, and still more preferably 90 to 99.5% by weight, relative to total amount. As components other than the water-absorbing resin, in view of water absorbing speed or impact resistance of the powders (particles), water is preferable, and the additives to be described later are contained as needed.

(b) "Polyacrylic Acid (Salt)"

In the present description, the "polyacrylic acid (salt)" means a polymer composed principally of acrylic acid (salt), as a repeating unit. Specifically, it contains acrylic acid (salt) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, further preferably an alkali metal salt or an ammonium salt, particularly preferably an alkali metal salt, and still more preferably a sodium salt.

(c) "EDANA" And "ERT"

In the present description, "EDANA" is an abbreviation of European Disposables and Nonwovens Association. The measurement method (ERT/EDANA Recommended Test Methods) for the water-absorbing resin of a European standard (nearly a world standard) is specified below. As for the detail, the ERT original (known document: revised in 2002) is referred to.

(d) "CRC" (ERT441.2-02)

In the present description, "CRC (Centrifuge Retention Capacity)" means absorbency against non-pressure (it may also be referred to simply "absorbency") or Centrifuge Retention Capacity, and in more specifically, it is absorbency (unit; g/g) after free swelling for 30 minutes in 0.9% sodium chloride solution and further water draining by centrifugal separating.

(e) "AAP" (ERT442.2-02)

In the present description, "AAP (Absorbency Against Pressure)" means absorbency under pressurization, and in more specifically, it means absorbency (unit; g/g) after swelling under a load of 21 g/cm² for 1 hour, in 0.9% sodium chloride aqueous solution. It should be noted that, hereafter in Examples of the present application, "AAP" is defined as a value measured similarly, except that a load was changed to 50 g/cm².

(f) "Extractables" (ERT470.2-02)

In the present description, "Extractables" mean amount of water-soluble components, and in more specifically, it is a soluble amount (unit; % by weight) of dissolved polymer after stirring 1 g of the water-absorbing resin in 200 g of 0.9% sodium chloride aqueous solution for 16 hours, measured by pH titration.

(g) "FSC" (ERT440.2-02)

In the present description, "FSC (Free Swell Capacity)" means free swelling ratio, and in more specifically, it means absorbency (unit; g/g) for 0.9% sodium chloride aqueous solution, without performing water draining by centrifugal separation.

(h) "Residual Monomers" (ERT410.2-02)

In the present description, "Residual Monomers" mean amount of residual monomers, and in more specifically, it is a value (unit; ppm by weight) of amount of residual monomers eluted in 0.9% sodium chloride solution, measured with a liquid chromatography.

(i) "Particle Size Distribution" (ERT420.2-02)

In the present description, "Particle Size Distribution" means particle size distribution measured by sieve classification. It should be noted that, weight average particle diameter and particle diameter distribution width are measured by a similar method as described in "(1) Average Particle Diameter and Distribution of Particle Diameter" in EP No. 0349240, page 7, lines 25 to 43.

(j) "SFC

In the present description, "SFC (Saline Flow Conductivity)" is an index showing liquid permeation under pressurization, and specifically, it is a value (unit: $10^{-7} \cdot cm^3 \cdot s \cdot g^{-1}$) measured in accordance with flow conductivity for 0.69% sodium chloride aqueous solution, specified in "1. Saline Flow Conductivity (SFC)" of WO 95/26209, pages 69-75.

(k) Other Specifications of the Water-Absorbing Resin by EDANA (Specifications in 2002) are as Follows "pH" (ERT400.2-02): pH of the water-absorbing resin.

"Moisture Content" (ERT430.2-2): moisture content of the water-absorbing resin.

"Flow Rate" (ERT450.2-02): flow rate of the water-absorbing resin powder.

"Density" (ERT460.2-02): bulk density of the water-absorbing resin.

"Respirable Particles" (ERT480.2-02)

"Dust" (ERT490.2-02)

(l) Multi-functionalizing and Making Higher Property of the Water-absorbing Resin The water-absorbing resin where 3 or more, 4 or more, in particular, 5 or more, and further 6 or more properties, for example, the above (d) to (k) or property equivalent thereto are controlled, is called the "multi-functionalized water-absorbing resin" or the "water-absorbing resin with multi-functions". In addition, the water-absorbing resin showing property of a range described later is called the "water-absorbing resin made to have high property" or the "water-absorbing resin with high property".

(m) Definition of Standard Deviation

Standard deviation is a value showing degree of data scattering and specifically calculated as shown by following expression: Difference between value of n pieces of data and arithmetic average thereof, that is, positive root of this value obtained by averaging square of deviation, and then dividing it by n−1. Standard deviation is used to know variation degree for phenomenon with a large amount of variation. It should be noted that, in the present description, standard deviation is calculated to express, as numerical value, variation (deflection) for objective desired property value.

$$N \text{ pieces of data } X1, X2, \ldots Xn \quad \text{[Expression 1]}$$

$$\text{Arithmetic average } X = \frac{1}{n}\sum_{i=1}^{n} Xi$$

$$\text{Standard deviation} = \sqrt{\frac{1}{n-1}\sum_{i=1}^{n}(Xi-X)^2}$$

(n) The Water-Containing Gel, the Dried Substance and the Powder Substance

In the present description, the "water-containing gel", the "dried substance" and the "powder substance" are defined as follows.

The "water-containing gel" indicates a water-containing gel-like cross-linked polymer of the water-absorbing resin. As a representative, it means the water-containing gel obtained in a polymerization step. Usually it indicates a polymer having a moisture content of equal to or higher than 30% by weight.

"The dried substance" indicates the dried polymer of the water-absorbing resin after the drying step. It usually indicates the dried polymer having the moisture content in the drying step of below 30% by weight, and still more equal to or less than 20% by weight, although it depends on the moisture content after polymerization. Shape thereof is not limited and drying may be performed at the same time as polymerization (drying by heat of polymerization or by heating during polymerization or the like).

The "powder substance" indicates a solid with a particle diameter specified by sieve classification of equal to or smaller than 5 mm, and the powder substance of the dried polymer of the water-absorbing resin, or the powder substance (for example, water-insoluble inorganic powders, polyvalent metal salt powders or hydrate salts thereof or the like) used as a solid as it is among raw materials or additives of the water-absorbing resin. Moisture content is not limited as long as it is a solid, but it is, usually below 30% by weight, and still more equal to or lower than 20% by weight. The lower limit of particle diameter is not especially limited, but, for example, 1 nm. It means a solid having certain fluidity as the powder substance, for example, a solid in a state where Flow Rate (ERT450.2-02) can be measured as fluidity, or a solid which can be sieve classified by (ERT420.2-02). It should be noted that, in general, there may be the case where those of equal to or larger than 1 mm are called granule, and those of below 1 mm are called powder substance, but, in the present invention, those power granule substances (the water-absorbing resin or raw materials thereof) are called generally the "powder substance" hereafter. In addition, in the present description, the "powder substance" and "powder" are treated as synonyms.

In addition, in the present description, "mass", "% by mass" and "parts by mass" are synonymous to "weight", "% by weight" and "parts by weight", respectively, and property or the like was measured at room temperature (20 to 25° C.)/a relative humidity of 40 to 50%, unless otherwise specified.

(2) A Hopper

The hopper is an apparatus for storing and keeping the powder granule substance (the powder substance) temporarily or for a long period, and in the present invention, a silo-like (longitudinally longer shape) one is also included, as long as it is specified shape. The hopper having specified shape, which is used essentially for the water-absorbing resin of the present invention, will be described in FIG. 1 and below. It should be noted that, the hopper of the present invention is applied to the water-absorbing resin powder substance or the dried substance, but, preferably it is also applied to an additive powder substance of the water-absorbing resin.

As shape of the hopper of the present invention, in view of carrying property and transferring property of the dried substance or the powder substance, preferably the powder substance, in particular, the water-absorbing resin powder substance, an inverse truncated pyramid shape or an inverse circular truncated cone shape, as shown in the left drawing of FIG. 1, and shape where a rectangular column of the same shape is added at the maximum caliber part of the inverse truncated pyramid, or shape where a circular cylinder of the same shape is added at the maximum caliber part of the inverse circular truncated cone, as shown in the right drawing of FIG. 1, are preferably used in the present invention. In addition, a material thereof is not especially limited, but, one made of stainless steel is used preferably. In addition, ratio of maximum caliber (diameter) and height of the hopper (maximum caliber of the hopper/height of the hopper) is in a range of 1/10 to 10/1, still more 1/3 to 3/1, and particularly 1/2 to 2/1. In this case, for the inverse truncated pyramid shape or the inverse circular truncated cone shape, as shown in the left drawing of FIG. 1, "height of the hopper" indicates height of the inverse truncated pyramid part or the inverse circular truncated cone part ("H" in the left and right drawings of FIG. 1). In addition, for the inverse truncated pyramid shape or the inverse circular truncated cone shape added with the rectangular column or the circular cylinder, as shown in the right drawing of FIG. 1, it indicates total height ("H'" in the right drawing of FIG. 1) of height of the inverse truncated pyramid part or the inverse circular truncated cone part, added with height of the rectangular column part or the circular cylinder part. In addition, when the hopper is not a cylinder, maximum caliber of the hopper is specified in terms of a diameter of a circle equivalent to the maximum cross-sectional area thereof. As for shape of the inverse truncated pyramid shape or the inverse circular truncated cone shape, as ratio of the inverse pyramid (or the inverse circular cone) and the frustum, it is adopted one where height of the frustum is smaller, or in the case where the hopper cross-section has home base shape, cross-section of the triangle part thereof is adopted principally. That is, a principal component of the dried substance/powder, preferably equal to or more than 50% by weight, and still more preferably equal to or more than 80% by weight is stored in a part of pyramid or circular cone of the hopper.

The present invention is the production method for the water-absorbing resin, characterized by using essentially the hopper having specified shape of an inclination angle of a cone part of equal to or larger than 45 degree, and a drawing rate of 30 to 80%. The upper limit of the inclination angle of a cone part is preferably equal to or smaller than 90 degree, and further below 90 degree. In the present description, "the inclination angle of a cone part" is, as shown in FIG. 1, inclination angle of a side wall surface relative to a horizontal surface of the hopper installed. The inclination angle of a cone part of the hopper of the present invention is set at equal to or larger than 45 degree, preferably equal to or larger than 50 degree, more preferably 60 to 90 degree, particularly preferably 65 to 85 degree, and most preferably 68 to 85 degree. In particular, in order to stably and continuously produce the water-absorbing resin with high property, such as an absorbency against pressure (AAP) of the resultant water-absorbing resin of equal to or higher than 20 (g/g), or a liquid permeation under pressurization (SFC) of equal to or higher than 10 ($10^{-7} \cdot cm^3 \cdot s \cdot g^{-1}$), it is preferable to set the inclination angle of a cone part at 65 to 85 degree, and most preferably at 68 to 85 degree.

It should be noted that, when the side wall surface is not flat, it is specified by average value of angles determined from the whole side wall surfaces thereof.

In addition, in the present description, the "drawing rate" is a value of ratio [(R2/R1)×100(%)] specified by caliber of the opening part of the upper surface of the hopper (maximum caliper part of the upper part of the hopper (R1)) and caliber of the opening part of the bottom surface of the hopper (caliber of the discharging part of the hopper (R2)), expressed in percent. The drawing rate of the hopper to be used in the present invention is 30 to 80%, preferably 35 to 80%, more preferably 40 to 80% particularly preferably 40 to 70%, and most preferably 45 to 65%. It should be noted that, when the caliber is not a circle, for example, in the case of an ellipse or a polygon, it is specified in terms of the caliber of a circle equivalent to the cross-sectional area thereof. In particular, in order to stably and continuously produce the water-absorbing resin with high property such as absorbency against pressure (AAP) of equal to or higher than 20 (g/g), or a liquid permeation under pressurization (SFC) of equal to or higher than 10 ($10^{-7} \cdot cm^3 \cdot s \cdot g^{-1}$), it is preferable that drawing rate is set at equal to or larger than 35%, preferably 35 to 80%, more preferably 40 to 80%, particularly preferably 40 to 70%, and most preferably 45 to 65%.

Further, it is most preferable that the hopper relevant to the present invention satisfies both the inclination angle of a cone part and the drawing rate of the above range, and still more preferably the inclination angle of a cone part of 65 to 85 degree and the drawing rate of 35 to 80%, particularly preferably the inclination angle of a cone part of 65 to 85 degree and the drawing rate of 40 to 80%, and most preferably the inclination angle of a cone part of 68 to 85 degree and the drawing rate of 40 to 80%.

Conventionally, as for the hopper in the production step of the water-absorbing resin, there have been known Patent Document 5 (U.S. Pat. No. 6,727,345) for using a buffering hopper and a metering supply hopper, or Patent Document 1 (U.S. Pat. No. 6,817,557) for using a hopper heated or retaining heat, and a hopper as in Patent Document 11 (US-A-2007-0225160), but, in the present application, specified shape of a hopper used at and after the drying step has been noticed, which has never been noticed at all conventionally from the viewpoint of property of the water-absorbing resin, and it has been discovered that by controlling the inclination angle of a cone part and the drawing rate of the hopper within the above range, in the drying step of the water-absorbing resin, the water-absorbing resin with high function and high property can be obtained in high productivity. It should be noted that, as in a drawing of Patent Document 10 (U.S. Pat. No. 4,985,518), there has been known a method for using a tank for storing various raw materials before polymerization, but, the present invention is characterized in obtaining the water-absorbing resin with high function and high property by using a hopper with specified shape for the water-absorbing resin at and after the drying step.

It should be noted that, when a hopper out of the above range is used, it becomes difficult to stably produce the water-absorbing resin with desired high property.

When the inclination angle of a cone part is over 90 degree, or the drawing rate is over 80%, or when the inclination angle of a cone part is below 45 degree, or the drawing rate is below 30%, property of the water-absorbing resin and stability thereof decrease significantly.

In addition, a filling rate (average) with the dried substance or the powder substance (the water-absorbing resin powder substance) in the hopper to be used in the present invention, although not limited in particular, is over 0% by volume and equal to or lower than 90% by volume, preferably 10 to 80% by volume, still more preferably 30 to 80% by volume, and particularly preferably 40 to 80% by volume. In the present description, the "filling rate" is specified by volume ratio (%) of the water-absorbing resin to be packed relative to internal volume of the hopper, and by controlling it within the above range, transfer property of the water-absorbing resin becomes good. It should be noted that, the filling rate outside the above range, for example, over 90%, could cause fracture of the water-absorbing resin, while the filling rate of 0% (including the case of not using the hopper of the present invention) could generate variation (deflection) of property by each lot. In particular, the case of the production amount of equal to or higher than 100 kg per 1 hour could generate increase in variation width (deflection width) or significant decrease in handling property.

A material of the hopper to be preferably used in the present invention is the stainless steel, and it is preferable that the inner surface of the hopper has been mirror finished. By this mirror finishing, damage suffered by the water-absorbing resin powder substance can be suppressed. By mirror finishing of the stainless steel, damage suppression effect enhances still more. The stainless steel includes SUS304, SUS316, SUS316L or the like.

In the present invention, the inner surface of the hopper is controlled to have a surface roughness (Rz), specified by JIS B 0601-2001, of equal to or smaller than 800 nm. The surface roughness (Rz) is smoothened to preferably equal to or smaller than 500 nm, more preferably equal to or smaller than 300 nm, still more preferably equal to or smaller than 200 nm, particularly preferably equal to or smaller than 185 nm, and most preferably equal to or smaller than 170 nm. Here, the surface roughness (Rz) means the maximal value of the maximal height (μm) of the surface irregularity. The lower limit of the surface roughness (Rz) is 0 nm, but, about 10 nm and still more about 20 nm is sufficient, because there is no significant difference even in about 10 nm. Other surface roughness (Ra) is also specified by JIS B 0601-2001 and preferable value thereof is set the same as in Rz. Ra is more preferably equal to or smaller than 250 nm, and particularly preferably equal to or smaller than 200 nm.

Such surface roughness can be measured with a probe-type surface roughness meter in accordance with JIS B 0651-2002.

Further, in the present invention, it is preferable that a residence time (average) of the water-absorbing resin in the hopper is also controlled, and the residence time is preferably equal to or shorter than 24 hours, more preferably equal to or shorter than 12 hours, still more preferably equal to or shorter than 6 hours and particularly preferably equal to or shorter than 2 hours, although it depends on amount of the water-absorbing resin to be packed in the hopper. The case where the residence time is over 24 hours may cause property decrease or blocking, and is thus not preferable. It should be noted that, the lower limit of the residence time (average) of the water-absorbing resin in the hopper is not especially limited, and it is preferable to be as short as possible.

When the powder substance is handled in each step to be described later, the hopper to be used in the present invention is applied at each step, in discharging the powder substance after storage of the powder substance in at least one or more places including and subsequent to the drying step. That is, the hopper may be installed at any time during the drying step; during the pulverization or classification step; during the surface cross-linking step; between the drying step and the pulverization or classification step; between the pulverization or classification step and the surface cross-linking step; during or after the step for filling (the filling step) a container bag or the like with the water-absorbing resin, obtained as the final product at and after the surface cross-linking step, between the surface cross-linking step and the filling step; or the like. In addition, the hopper may be installed at one place, or at two or more places at each of the time. Further, in the latter case, a plurality of the hoppers may be installed continuously, or other step (or an apparatus) may be installed between the hoppers. The hopper is preferably used between the step for drying or pulverization or classification of the water-containing gel to be described later ((14), (15) to be described later), and the surface cross-linking step ((16), (17) to be described later) (hereafter, the hopper to be used between these steps will be referred to as an intermediate hopper); or just before the step for filling ((19) to be described later) a container bag or the like with the water-absorbing resin, obtained as the final product at and after the surface cross-linking step (hereafter, the hopper to be used in this will be referred to as a product hopper).

In addition, in order to solve the problem of the present application, the hopper is installed preferably between the pulverization or classification step for pulverizing and classifying the dried substance, and the surface cross-linking step after classification.

In addition, the hoppers are installed, including the above, at two or more places, at three or more places, still more at four or more places, further at five or more places in the whole steps of the production steps of the water-absorbing resin. It should be noted that, the upper limit of installation number of the hopper is not especially limited.

In addition, it is preferable that the hopper is heated or retains heat so as to have constant temperature. In addition, it is preferable that a powder substance (the water-absorbing resin powder substance) is also heated or retains heat so as to have constant temperature. Temperature of the hopper or the water-absorbing resin powder substance (temperature of the wall surface of the hopper or the powder) is not especially limited, but it is, in a range of preferably 40 to 120° C., more preferably 50 to 90° C., and particularly preferably 60 to 80° C. Here, too low temperature may cause aggregation or property decrease, while too high temperature may cause a problem of property decrease or coloring after surface cross-linking. It should be noted that, in the present invention, it may be enough that at least either of the hopper and the water-absorbing resin powder substance is heated or retains heat, but, in consideration of heat retaining property thereof, it is preferable that both are heated or retains heat. In addition, when both of the hopper and the water-absorbing resin powder substance are heated or retain heat, these temperatures may be the same temperature or different temperature, but, in view of economy by heat loss, it is preferable to be the same temperature.

In the present invention, it is preferable that inside of the hopper, in particular, the upper space in the hopper, that is, a space part where the water-absorbing resin is not packed inside the hopper, is maintained in a reduced pressure state. In particular, it is preferable that the reduced pressure state in the hopper has a degree of reduced pressure of preferably over 0 kPa and equal to or lower than 10 kPa, and preferably 5 to 8 kPa relative to atmospheric pressure. In the present invention, by maintaining inside of the hopper in the reduced pressure state, in transporting the water-absorbing resin from the hopper to the next step, due to enhancement effect of carrying property of the powder substance or damage suppression effect for the water-absorbing resin powder, the water-absorbing resin with high function and high property can be produced stably.

The hopper of the present invention may be enough to have the inclination angle of a cone part and the drawing rate within the above range, and other requirements, for example, internal volume of the hopper are not especially limited. Usually, the internal volume of the hopper is preferably 1 to 100 m$^3$. It should be noted that, this internal volume is applicable to both an intermediate hopper and a product hopper, and, it is preferable to be the following internal volume.

That is, the intermediate hopper of the present invention may be enough to have the inclination angle of a cone part and the drawing rate within the above range, and, the internal volume is preferably 1 to 20 m$^3$ and more preferably 2 to 10 m$^3$.

By using such an intermediate hopper, it becomes possible to feed to a mixing apparatus of the surface cross-linking agent, in quantitative mass flow, without damaging or fracturing the water-absorbing resin, in mixing the water-absorbing resin powder and the surface cross-linking agent at the surface cross-linking step. In this way, the water-absorbing resin with high function and high property can be produced stably without variation by each lot.

In addition, as long as the product hopper has the inclination angle of a cone part and the drawing rate within the above range, the internal volume is not especially limited, but it is, in consideration of a production scale of equal to or higher than 100 kg per 1 hour, and pressure for the water-absorbing resin powder at the neighborhood of the bottom surface of the hopper, preferably 5 to 100 m$^3$, more preferably 10 to 100 m$^3$, and particularly preferably 20 to 80 m$^3$.

It should be noted that, the water-absorbing resin is discharged from the hopper (the intermediate hopper and the product hopper) of the present invention by a damper, a rotary valve, a table feeder, a screw feeder, an air slide, a rotation floor system or the like.

In the present invention, in discharging the water-absorbing resin from the hopper, depending on an object, discharge may be performed using one discharge apparatus, or discharge may be performed using a plurality of the discharge apparatuses at the same time.

In addition, in the present invention, after temporary storage in the hopper, for example, depending on an object, such as stable production of the water-absorbing resin with still more high property under higher control, the water-absorbing resin may be discharged using one step or a plurality of steps as needed.

It should be noted that, as an embodiment exerting most effect of the present invention, the method of the present invention is applied to a production method in producing the water-absorbing resin in a production amount of, for example, equal to or higher than 100 kg per hour, preferably equal to or higher than 500 kg per hour, and particularly preferably equal to or higher than 1 ton per hour.

It is preferable that the hopper is heated, and temperature of the surface thereof is in a range of 40 to 120° C., still more 50 to 90° C., and in particular 60 to 80° C. In addition, it is preferable that powder stored in the hopper is also heated, and temperature thereof is in a range of 40 to 120° C., still more 50 to 90° C., and in particular 60 to 80° C. The case of lower temperature than the above temperature may cause decrease in property value or increase in deflection width of property value, and aggregation of the water-absorbing resin. In addition, the case of higher temperature than the above temperature may cause decrease property value or increase in deflection width of property value, as well as coloring of the water-absorbing resin.

In addition, moisture content of the dried substance or the water-absorbing resin to be supplied (packed) and stored in this hopper is not especially limited, but it is, preferably 0.1 to 30% by weight, more preferably 0.5 to 20% by weight, and particularly preferably 0.1 to 10% by weight. By setting the moisture content at the above range, in supplying (filling) and storing the dried substance or the water-absorbing resin in said hopper, damage can be reduced and property decrease can be suppressed. It should be noted that, the moisture content of the dried substance or the water-absorbing resin to be stored in the hopper may be the same or different.

This hopper is installed and preferably stored essentially at least one place, preferably at two or more places, in all of the production steps of the water-absorbing resin. The storing place is one or more places, still more two or more places, in particular three or more places, and in particular four or more places (the upper limit is determined as appropriate, but it is, equal to or less than 20 places, still more equal to or less than 10 places) of the final product (for filling a product) to be described later or the intermediate step (after drying to the final product).

In the case of storing in this hopper, as a method for carrying the dried substance or the water-absorbing resin from the previous step, carrying (transferring) by a carrying machine (for example, pneumatic transportation, a belt conveyor, a screw conveyor, a bucket conveyor, or the like) or dropping by gravitational force or the like is included. The method for carrying the water-absorbing resin to the hopper is not especially limited, but, pneumatic transportation or dropping by gravitational force is preferable in order to still more enhance effect of suppression of property decrease by damage, and carrying by pneumatic transportation is preferable in order to most suppress property decrease by damage.

Further, when the dried substance or the water-absorbing resin powder substance is carried to the next step after being stored in this hopper, similarly as in carrying to the hopper, it is carried (transferred) by a carrying machine (for example, pneumatic transportation, a belt conveyor, a screw conveyor, a bucket conveyor, or the like) or dropping by gravitational force or the like. The method for carrying the water-absorbing resin powder from the hopper is not especially limited, but, pneumatic transportation or dropping by gravitational force is preferable to still more enhance effect of suppression of property decrease by damage, and carrying by pneumatic transportation is preferable to most suppress property decrease by damage.

(3) A Monomer (Excluding a Cross-Linking Agent)

The acrylic acid aqueous solution used in the present invention contains acrylic acid or a salt thereof as a principal component. In addition, it is preferable that the water-containing gel (polymer) obtained by polymerization is neutralized at least at a part of the acid groups of the polymer, in view of water absorption characteristics, and neutralization ratio of the water-containing gel (polymer) is not especially limited, but, preferably 10 to 100% by mole, more preferably 30 to 95% by mole, still more preferably 50 to 90% by mole, and particularly preferably 60 to 80% by mole. The neutralization may be performed for the polymer (water-containing gel) after polymerization, or polymerization may be performed using a salt form acrylic acid as a monomer, but, in view of enhancement of productivity or AAP (absorbency against pressure), SFC (liquid permeation under pressurization, saline flow conductivity), preferably a neutralized monomer is used, that is, a partially neutralized salt of acrylic acid is used as a monomer. Such a salt of acrylic acid is not especially limited, but, in view of water-absorbing performance of the water-absorbing resin, it is preferably a monovalent salt of acrylic acid selected from an alkali metal salt, a ammonium salt and an amine salt of acrylic acid, more preferably an alkali metal salt of acrylic acid, and still more preferably an acrylate selected from a sodium salt, a lithium salt and a potassium salt, and particularly preferably a sodium salt.

In addition, in the present invention, as the acrylic acid aqueous solution, a hydrophilic or hydrophobic unsaturated monomer other than acrylic acid (salt) (other monomer) may be used. Other monomer which can be used includes methacrylic acid, maleic acid (anhydride), 2-(meth)acrylamido-2-methylpropane sulfonic acid, (meth)acryloxyalkanesulfonic acid, N-vinyl-2-pyrrolidone, N-vinylacetamide, (meth) acrylamide, N-isopropyl (meth)acrylamide, N,N-dimethyl(meth)acrylamide, 2-hydroxyethyl(meth)acrylate, methoxy polyethylene glycol (meth)acrylate, polyethylene glycol (meth) acrylate, stearyl acrylate or a salt thereof. When such other monomer is used, use amount thereof is not especially limited, as long as it is a degree not to impair desired characteristics, and, preferably equal to or lower than 50% by weight, and more preferably 0 to 20% by weight, relative to weight of total monomers.

The monomer and other monomer if used may be used each alone, or may be used in a mixture form of two or more kinds.

(4) A Cross-Linking Agent (an Internal Cross-Linking Agent)

In the present invention, it is particularly preferable to use a cross-linking agent (other name; an internal cross-linking agent) in view of water absorbing characteristics. Use amount of the internal cross-linking agent is, in a property aspect, preferably 0.001 to 5% by mole, more preferably 0.005 to 2% by mole, still more preferably 0.01 to 1% by mole, and particularly preferably 0.03 to 0.5% by mole, relative to the monomer excluding the cross-linking agent.

As the cross-linking agent which can be used, for example, a polymerizable cross-linking agent (with acrylic acid), a reactable cross-linking agent (with a carboxylic group), a cross-linking agent having both thereof or the like can be exemplified. Specifically, as the polymerizable cross-linking agent, a compound having at least two polymerizable double bonds in a molecule, such as N,N'-methylenebisacrylamide, (poly)ethylene glycol di(meth)acrylate, (polyoxyethylene)trimethylolpropane tri(meth)acrylate, poly(meth)allyloxy alkane can be exemplified. In addition, as the reactable cross-linking agent, a cross-linking agent having covalent binding property such as polyglycidyl ether (ethylene glycol diglycidyl ether or the like), polyhydric alcohol (propanediol, glycerin, sorbitol or the like); or a cross-linking agent having ionic binding property, which is a compound of a polyvalent metal such as aluminum can be exemplified. Among these, in an aspect of water absorbing characteristics, the polymerizable cross-linking agent (with acrylic acid) is preferable, and in particular, an acrylate-based, an allyl-based, or an acrylamide-based polymerizable cross-linking agent is suitably used.

(5) A Salt for Neutralization

When an aclylate salt is use as a monomer, as a basic substance, which can be used in neutralization of a polymer or acrylic acid, a monovalent base such as a hydroxide of an alkali metal such as sodium hydroxide, potassium hydroxide, lithium hydroxide, or a (hydrogen) carbonate salt such as sodium (hydrogen) carbonate, potassium (hydrogen) carbonate is preferable, and a sodium salt with sodium hydroxide is particularly preferable. It should be noted that, preferable condition or the like of these neutralization treatments has been exemplified in EP No. 574260, and condition described in this publication is also applicable to the present invention. Neutralization temperature is determined as appropriate at 10 to 100° C., or 30 to 90° C.

(6) Concentration of the Monomer

The above-described monomer (including the cross-linking agent) is usually polymerized as an aqueous solution, and concentration of solid content thereof is usually 10 to 90% by weight, preferably 20 to 80% by weight, still more preferably 30 to 70% by weight, and particularly preferably 35 to 60% by weight. In addition, when the monomer is polymerized in an aqueous solution, a surfactant, a polymer compound such as polyacrylic acid (salt) or starch, polyvinyl alcohol or the like, various chelating agents, various additives may be added in combination in 0 to 30% by weight (relative to the monomer).

(7) The Other Monomer Components

Further, a water-soluble resin or a water-absorbing resin such as starch, polyacrylic acid (salt), polyethyleneimine or the like, for example, in an amount of 0 to 50% by weight, more preferably 0 to 20% by weight, particularly preferably 0 to 10% by weight, and most preferably 0 to 3% by weight, relative to the monomer; or various foaming agents (a carbonate salt, an azo compound, bubbles and the like), a surfactant, and additives to be described later may be added for example, in an amount of 0 to 5% by weight, and preferably 0 to 1% by weight relative to the monomer, to the aqueous solution of acrylic acid (salt), the water-containing gel after polymerization, the dried substance or the powder substance, to improve various properties of the water-absorbing resin obtained. That is, the chelating agent, hydroxycarboxylic acid and a reducing inorganic salt are contained preferably 10 to 5000 ppm by weight, more preferably 10 to 1000 ppm by weight, still more preferably 50 to 1000 ppm by weight, and particularly preferably 100 to 1000 ppm by weight, in the water-absorbing resin. Preferably, the chelating agent is used essentially.

(8) The Chelating Agent and α-Hydroxycarboxylic Acid

It is preferable that the method of the present invention still more includes a step for adding the chelating agent. By using the chelating agent, enhancement of color stability (color stability in storing the particulate water-absorbing agent under high temperature and high humidity condition for a long period of time) or urine resistance (prevention of gel deterioration) of the water-absorbing resin of the present invention can be attained.

Here, the chelating agent is not especially limited and for example, one exemplified in EU-A-1426157, WO 2007/28751 and WO 2008/090961 can be used. In aspect of effect, a preferable one is a water-soluble organic chelating agent with a molecular weight of the chelating agent of 100 to 1000. Specifically, a preferable chelating agent is an amino carboxylic acid-based metal chelating agent such as iminodiacetic acid, hydroxyethyliminodiacetic acid, nitrilotriacetic acid, nitrilotripropionic acid, ethylenediamine tetraacetic acid, hydroxyethylenediamine triacetic acid, hexamethylenediamine tetraacetic acid, diethylenetriamine pentaacetic acid, triethylenetetramine hexacetic acid, and a salt thereof; and an aminopolyvalent phosphoric acid compound such as ethylenediamine-N,N'-di(methylenephosphinic acid), ethylenediamine tetra(methylenephosphinic acid), polymethylenediamine tetra(methylenephosphonic acid), diethylenetriamine penta(methylenephosphonic acid), 1-hydroxyethylidene diphosphonic acid, and a salt thereof.

In addition, the addition timing of the chelating agent is also not especially limited, and any timing may be allowed, for example: (a) the chelating agent is added in an aqueous solution of acrylic acid in the polymerization step, and polymerization is performed in the presence of the chelating agent; (b) the chelating agent is added to the water-containing gel after polymerization in the polymerization step; (c) the chelating agent is added during or after drying in the drying step; (d) the chelating agent is added during or after pulverization or classification of the dried substance in the pulverization or classification step; (e) the chelating agent is added during or after surface cross-linking in the surface cross-linking step; or the like.

In addition, it is preferable that the method of the present invention further includes a step for adding the α-hydroxycarboxylic acid. By using the α-hydroxycarboxylic acid, effect of color stability of the water-absorbing resin of the present invention can be enhanced. Here, the α-hydroxycarboxylic acid is not especially limited, and α-hydroxycarboxylic acid as exemplified in WO 2008/026772 may be used. In addition, the addition timing of the α-hydroxycarboxylic acid is also not especially limited, and any timing may be allowed, for example: (a) the α-hydroxycarboxylic acid is added in an aqueous solution of acrylic acid in the polymerization step, and polymerization is performed in the presence of the α-hydroxycarboxylic acid; (b) the α-hydroxycarboxylic acid is added to the water-containing gel after polymerization in the polymerization step; (c) the α-hydroxycarboxylic acid is added during or after drying in the drying step; (d) the α-hydroxycarboxylic acid is added during or after pulverization or classification of the dried substance in the pulverization or classification step; (e) the α-hydroxycarboxylic acid is added during or after surface cross-linking in the surface cross-linking step; or the like. Among them, (a), (b) and (c) are preferable. Particularly preferably, hydroxycarboxylic acid such as lactic acid (salt), citric acid (salt), malic acid (salt), in particular, non-polymer hydroxycarboxylic acid (salt) or the like is used in the aqueous solution of acrylic acid (the monomer) or the water-containing gel (the polymer thereof).

(9) A Reducing Agent

It is preferable that the method of the present invention still more includes a step for adding the reducing agent. The reducing inorganic salts exemplified in EP-A-1577349, EP No. 1169379 and USP-A-2008/0227933 may be used. It should be noted that, in using the reducing agent the addition timing of the reducing agent is also not especially limited, and any timing may be allowed, for example: (a) the reducing agent is added in an aqueous solution of acrylic acid in the polymerization step, and polymerization is performed in the presence of the reducing agent; (b) the reducing agent is added to the water-containing gel after polymerization in the polymerization step; (c) the reducing agent is added during or after drying in the drying step; (d) the reducing agent is added during or after pulverization or classification of the dried substance in the pulverization or classification step; (e) the reducing agent is added during or after surface cross-linking in the surface cross-linking step; (f) the reducing agent is added to the water-absorbing resin as the final product; or the like. In addition, use amount of the reducing agent is also not especially limited, as long as it is a degree not to impair characteristics of the water-absorbing resin.

(10) The Surfactant and the Water-Insoluble Inorganic Particle

A composition of the present invention may be added with the surfactant and the water-insoluble inorganic particle to enhance powder substance characteristics (powder substance fluidity or fluidity in moisture absorption or the like) as needed. Therefore, it is preferable that the method of the present invention still more includes a step for adding the surfactant. In addition, it is preferable that the method of the present invention still more includes a step for adding the water-insoluble inorganic particle.

When the method of the present invention further includes the step for adding the surfactant, use amount of the surfactant is not especially limited, as long as it is a degree not to impair characteristics of the water-absorbing resin. Specifically, use amount of the surfactant is preferably 0.1 to 1000 ppm by weight, more preferably 0.5 to 500 ppm by weight, and still more preferably 1 to 100 ppm by weight, relative to the water-absorbing resin. When use amount is outside this range, there may be the case of not providing desired powder substance fluidity effect or decreasing absorption characteristics.

As the surfactant, an anionic surfactant such as a fatty acid salt or a higher alcohol sulfate; such as a sorbitan fatty acid ester such as sorbitan monolaurate, sorbitan monopalmitate, sorbitan monostearate, sorbitan tristearate; a cationic surfactant or an ampholytic surfactant such as an alkyl amine salt such as coconut amine acetate, stearyl amine acetate is exemplified. Other than these, a surfactant described in U.S. Pat. No. 6,107,358 is applicable to the present invention. It should be noted that, the addition method for the surfactant is not especially limited, and preferably it is added at the granulation step exemplified in U.S. Pat. Nos. 6,228,930, 6,458,921, 7,153,910 and 7,378,453. In addition, the addition timing of the surfactant is also not especially limited, and any timing may be allowed, for example: (a) the surfactant is added in an aqueous solution of acrylic acid in the polymerization step, and polymerization is performed in the presence of the surfactant; (b) the surfactant is added to the water-containing gel after polymerization in the polymerization step; (c) the surfactant is added during or after drying in the drying step; (d) the surfactant is added during or after pulverization or classification of the dried substance in the pulverization or classification step; (e) the surfactant is added during or after surface cross-linking in the surface cross-linking step; (f) the surfactant is added to the water-absorbing resin as the final product; or the like.

In addition, in the present invention, the water-insoluble inorganic particle may be added as needed with the similar object as the surfactant. By this addition, powder substance characteristics (powder substance fluidity or fluidity in moisture absorption or the like) of the water-absorbing resin can be enhanced. The water-insoluble inorganic particle is one example of a suitable powder substance which can be used in the present invention other than the water-absorbing resin powder substance, and it is preferably stored in the hopper of the present invention similarly to the water-absorbing resin powder substance.

In the present description, "water-insoluble" indicates one having a solubility of equal to or lower than 0.1 g in 100 g of ion exchanged water at 20° C., and specifically a preferable inorganic particle includes an inorganic fine particulate powder substance such as silicon dioxide, titanium dioxide, aluminum oxide, magnesium oxide, zinc oxide, talc, calcium phosphate, barium phosphate, clay, diatom earth, zeolite, bentonite, kaolin, hydrotalcite, activated white earth or the like. In addition, preferable addition amount thereof is not especially limited, as long as it is a degree not to impair characteristics of the water-absorbing resin. Specifically, use amount of the water-insoluble inorganic particle is in a range of 0.001 to 10 parts by weight, preferably 0.005 to 5 parts by weight relative to 100 parts by weight of the water-absorbing resin. It should be noted that, as for detail of the addition method for the water-insoluble inorganic particle or the like, technology disclosed in EP-A-1840157 may be adopted.

In addition, when the water-insoluble inorganic particle is used, the addition timing of the relevant water-insoluble inorganic particle is also not especially limited, and any timing may be allowed, for example: (a) the water-insoluble inorganic particle is added in an aqueous solution of acrylic acid in the polymerization step, and polymerization is performed in the presence of the water-insoluble inorganic particle; (b) the water-insoluble inorganic particle is added to the water-containing gel after polymerization in the polymerization step; (c) the water-insoluble inorganic particle is added during or after drying in the drying step; (d) the water-insoluble inorganic particle is added during or after pulverization or classification of the dried substance in the pulverization or classification step; (e) the water-insoluble inorganic particle is added during or after surface cross-linking in the surface cross-linking step; (f) the water-insoluble inorganic particle is added to the water-absorbing resin as the final product; or the like. Among these, (d), (e) and (f) are preferable, and (f) is more preferable.

(11) The Polymerization Step (the Cross-Linking Polymerization Step)

As the polymerization method, in view of performance or easiness of polymerization control, usually aqueous solution polymerization or reverse phase suspension polymerization, in particular, aqueous solution polymerization, where control of polymerization or improvement of coloring was difficult conventionally, still more continuous aqueous solution polymerization is performed. In particular, it can be suitably controlled in continuous polymerization in producing the water-absorbing resin in a large scale of equal to or higher than 0.5 t/hr, still more equal to or higher than 1 t/hr, more further equal to or higher than 5 t/hr, and in particular, equal to or higher than 10 t/hr, by polymerizing an aqueous solution of unsaturated monomer in one line (it should be noted that "ton" and "t" indicate Metric ton, that is, 1000 kg is 1 ton). Therefore, as preferable continuous polymerization, continuous kneader polymerization (for example, U.S. Pat. Nos. 6,987,151 and 6,710,141), or continuous belt polymerization (for example, U.S. Pat. Nos. 4,893,999, 6,241,928 and USP-A- 2005-215734) is included suitably. That is, the method of the present invention is suitably used in a large scale continuous production, and exerts significant effect in equal to or higher than 0.5 t/hr, still more equal to or higher than 1 t/hr, more further equal to or higher than 5 t/hr, and in particular, equal to or higher than 10 t/hr per one line. The upper limit of the production amount is not especially limited, but, in view of absorption characteristics or production efficiency, for example, it is set preferably at equal to or lower than 100 t/hr.

It should be noted that, in continuous polymerization, polymerization by initiation at high temperature (the monomer is at equal to or higher than 30° C., equal to or higher than 35° C., still more equal to or higher than 40° C., and particularly equal to or higher than 50° C. The upper limit is boiling point.) and in high monomer concentration (equal to or higher than 30% by weight, particularly equal to or higher than 35% by weight, still more equal to or higher than 40% by weight, and particularly equal to or higher than 45% by weight. The upper limit is saturation concentration.) may be exemplified as a preferable example (U.S. Pat. Nos. 6,906,159, 7,091,253 or the like). By using these polymerizations at high temperature and in high concentration and drying by heat of polymerization at the same time as polymerization, the water-absorbing resin with energy saving as well as high property can be obtained.

These polymerizations may be performed even under air atmosphere, but, in view of improving coloring, it is preferable to be performed under inert gas atmosphere such as nitrogen or argon (for example, an oxygen concentration of equal to or lower than 1% by volume). In addition, it is preferable that, after dissolved oxygen in the monomer or a solution containing the monomer is sufficiently substituted with inert gas (for example, an oxygen concentration of below 1 ppm by volume), the monomer component is used for polymerization. Even in such degassing, monomer stability is superior and the water-absorbing resin with higher property and higher whiteness can be provided, without generating gelling before polymerization.

(12) A Polymerization Initiator

The polymerization initiator which can be used in the present invention is selected as appropriate depending on polymerization form. As such a polymerization initiator, for example, a photodecomposition-type polymerization initiator, a thermal decomposition-type polymerization initiator, a redox-type polymerization initiator or the like can be exemplified. Use amount of the polymerization initiator is preferably 0.0001 to 1% by mole, and more preferably 0.001 to 0.5% by mole relative to the monomer. The increased amount of the polymerization initiator may incur coloring of the water-absorbing resin, while the decreased amount may increase residual monomers.

As the photodecomposition-type initiator, for example, a benzoin derivative, a benzyl derivative, an acetophenone derivative, a benzophenone derivative, an azo compound may be exemplified. In addition, as the thermal decomposition-type initiator, for example, a persulfate (sodium persulfate, potassium persulfate, ammonium persulfate), a peroxide (hydrogen peroxide, t-butylperoxide, methyl ethyl ketone peroxide), an azo compound (2,2'-azobis(2-amidinopropane) dihydrochloride, 2,2'-azobis[2-(2-imidazoline-2-yl)propane] dihydrochloride or the like) may be exemplified.

As the redox-type polymerization initiator, for example, a system used in combination of the persulfate salt or the peroxide and a reducing compound such as L-ascorbic acid or sodium hydrogen sulfite, and combined both may be exemplified. In addition, combined use of the photodecomposition-type initiator and the thermal decomposition-type initiator is also included as a preferable embodiment.

(13) A Gel Fine Pulverization Step

The water-containing gel (water-containing gel-like cross-linked polymer) obtained in the polymerization may be dried as it is, but, it may be converted to a particle state by gel crushing, as needed, by use of a crushing machine (a kneader, a meat chopper or the like) during polymerization or after polymerization.

As temperature of the water-containing gel in gel crushing is, in view of property, it is preferable to retain at or rise to preferably 40 to 95° C., more preferably 50 to 80° C. Resin solid content of the water-containing gel is not especially limited, but it is, in view of property, preferably 10 to 70% by weight, more preferably 15 to 65% by weight, and still more preferably 30 to 55% by weight. Water or a polyhydric alcohol, a mixed solution of water and the polyhydric alcohol, a solution where a polyvalent metal is dissolved in water, or steam thereof may be added.

(14) The Drying Step

In the problem of the present invention, still more, in order to attain decrease of residual monomers, prevention of gel deterioration (urine resistance) and prevention of yellowing, it is preferable that time from completion of polymerization to start drying via the gel pulverization step as needed is shorter. That is, it is preferable to start drying (charge into a dryer) of the water-containing gel (water-containing gel-like cross-linked polymer) after polymerization within 1 hour, more preferably within 0.5 hour, and still more preferably within 0.1 hour. In addition, it is preferable to control temperature of the water-containing gel (water-containing gel-like cross-linked polymer) from polymerization to start drying at 50 to 80° C., and more preferably at 60 to 70° C. in order to attain decrease in residual monomers of low coloring.

It is preferable that resin solid content determined by reduced amount on drying (in heating 1 g of powders or particles at 180° C. for 3 hours) is adjusted in a range of equal to or higher than 80% by weight, more preferably 85 to 99% by weight, still more preferably 90 to 98% by weight, and particularly preferably 92 to 97% by weight to obtain a dried substance. In addition, drying temperature is not especially limited, but it is, preferably within a range of 100 to 300° C., and more preferably within a range of 150 to 250° C. In order to satisfy both high property and whiteness, it is preferable that drying temperature is 165 to 230° C. and drying time is within 50 minutes, and more preferably 20 to 40 minute in the drying step. Drying temperature or drying time outside this range could incur decease in absorbency (CRC), increase in soluble components ("Extractables") or decrease in whiteness degree.

A drying method may be performed at the same time as polymerization, or the drying step may be installed separately, or drying during polymerization and drying after polymerization may be used in combination, but, in view of property, it is preferable that the drying step is set separately after the polymerization step. Drying after polymerization is not especially limited, and, various methods may be adopted, such as heating drying, hot air drying, reduced pressure drying, infrared ray drying, microwave drying, drum dryer drying, azeotropic dehydration with a hydrophobic organic solvent, high humidity drying using high temperature steam. Among these, hot air drying using gas with a dew point of 40 to 100° C., more preferably a dew point of 50 to 90° C.

Shape of the dried substance obtained by drying the water-containing gel differs depending on shape of the water-containing gel or a drying method and, for example, shape such as the powder substance or an aggregated dried substance of the powder substance (for example, a block-like substance of the powder substance), sheet-like, fiber-like, film-like shape or the like can be included. In particular, hot air drying tends to provide the aggregated dried substance of the powder substance (a block-like substance of the powder substance).

(15) The Pulverization or Classification Step (Adjustment of Particle Size after Drying)

In the present application, the powder substance, in particular the water-absorbing resin is stored essentially in the specified hopper at and after the drying step, and then discharged. One preferable step is storing the water-absorbing resin after the drying, in the hopper before pulverization, and further supplying it to the pulverization step (a pulverization machine). Thereby in making a powder substance by pulverizing the dried substance of the water-containing gel, in particular, the aggregated dried substance, particle size control of the water-absorbing resin after the pulverization becomes possible. As the pulverization machine, there is a pin mill, a roll mill, a roll granulator or the like. Average particle diameter of the dried substance before pulverization is 0.5 to 50 mm, and still more 1 to 5 mm, and is adjusted to the following particle diameter after pulverization.

After a step for drying the above-described water-containing gel (the water-containing gel-like cross-linked polymer), particle size (average particle diameter, particle diameter distribution or the like) may be adjusted after drying as needed, and, in order to enhance property in surface cross-linking to be described later, preferably it is converted to specified particle size. The particle size may be adjusted as appropriate by polymerization (in particular, reverse phase suspension polymerization), pulverization, classification, granulation, fie-powder recovery or the like. Hereafter, the particle size will be specified with a standard sieve (JIS Z8801-1 (2000)).

Mass average particle diameter (D50) before surface cross-linking is adjusted at 200 to 600 µm, preferably 200 to 550 µm, more preferably 250 to 500 µm, and particularly preferably 350 to 450 µm. In addition, the lower particles below 150 µm is the better, and content of the particles below 150 µm is usually preferably 0 to 5% by weight, more preferably 0 to 3% by weight, and particularly preferably from 0 to 1% by weight. Still more, the lower particles equal to or larger than 850 µm is the better, and content of the particles of 850 µm or more is usually preferably 0 to 5% by weight, more preferably 0 to 3% by weight, and particularly preferably from 0 to 1% by weight. Logarithm standard deviation ($\sigma\zeta$) of particle size distribution is set at preferably 0.2 to 0.6, more preferably 0.2 to 0.5, further preferably 0.2 to 0.4, further more preferably 0.27 to 0.4, and most preferably 0.3 to 0.4. These measurement methods using standard sieves, for example, have been described in WO 2004/069915 or EDANA-ERT420.2-02.

In general, control of particle size distribution to a narrow range, that is, control of the upper and lower limits of the particle size results in obvious coloring in measurement, but, the present invention has no such a coloring problem and is thus preferable. Therefore, the present invention includes the classification step, where ratio of particles having the mass average particle diameter (D50) of 850 to 150 µm becomes equal to or higher than 95% by weight, and still more equal to or higher than 98% by weight (the upper limit is 100% by weight) preferably after dying. It should be noted that, the above particle size of the water-absorbing resin is applied also to the final product.

(16) The Surface Cross-Linking Step

In the present application, the powder substance, in particular the water-absorbing resin is stored essentially in the specified hopper at and after the drying step, and then discharged. One particularly preferable step is storing the water-absorbing resin before cross-linking, in the hopper, and further supplying it to the pulverization step (mixing and reaction of the surface cross-linking agent), and thus enhancement and stabilization of property of the water-absorbing resin after cross-linking becomes possible. A preferable mixing machine of the surface cross-linking agent includes various high speed stirring mixing or a fluidized bed. In addition, heat treatment also includes various heat treatment machines.

The present invention further includes the surface cross-linking step for a powder substance pulverized and classified as above. In the production method of the present invention, coloring (coloring of surface color of the water-absorbing resin) in surface cross-linking is also less, and the whiter water-absorbing resin can be obtained. In particular, the present invention is applied suitably to the water-absorbing resin obtained by surface cross-linking treatment by heating at high temperature.

It should be noted that, explanation will be given below on the surface cross-linking step using an organic or inorganic surface cross-linking agent which is capable of cross-link reacting with a functional group of the water-absorbing resin, but, the surface cross-linking may be performed without using the surface cross-linking agent. As such surface cross-linking, surface cross-linking with a radical polymerization initiator (for example, U.S. Pat. No. 4,783,510), surface cross-linking with activated energy rays (for example, EP-A-1506788), surface cross-linking by polymerization at the surface (for example, U.S. Pat. No. 7,201,941), or the like may also be applied to the present invention.

As the surface cross-linking agent which can be used in the present invention, various organic or inorganic surface cross-linking agents can be exemplified, and the organic surface cross-linking agents are preferably used. Preferably, as the surface cross-linking agent, there is a polyhydric alcohol compound, an epoxy compound, a polyvalent amine compound or a condensed compound thereof with a halo-epoxy compound, an oxazoline compound, a (mono-, di-, or poly-) oxazolidinone compound, and an alkylene carbonate compound, and in particular, a cross-linking agent having dehydration esterification reactivity, consisting of a polyhydric alcohol compound, an alkylene carbonate compound, and an oxazolidinone compound, requiring a reaction at high temperature, may be used.

More specifically, compounds exemplified in U.S. Pat. Nos. 6,228,930, 6,071,976, 6,254,990 or the like may be included. For example, a polyhydric alcohol compound such as mono-, di-, tri-, or tetrapropylene glycol, 1,3-propanediol, glycerin, 1,4-butanediol, 1,3-butanediol, 1,5-pentanediol, 1,6-hexanediol, sorbitol; an epoxy compound such as ethylene glycol diglycidyl ether, glycidol; an alkylene carbonate compound such as ethylene carbonate; an oxetane compound; a cyclic urea compound such as 2-imidazolidinone; and the like are included.

The organic surface cross-linking agents may be used alone or as a mixed form of two or more kinds.

Use amount of the surface cross-linking agent is not especially limited, and may be determined as appropriate in about 0.001 to 10 parts by weight, or 0.01 to 5 parts by weight relative to 100 parts by weight of the water-absorbing resin. Water may preferably be used with the surface cross-linking agent. Use amount of water is not especially limited, but it is, in a range of 0.5 to 20 parts by weight, more preferably 0.5 to 10 parts by weight relative to 100 parts by weight of the water-absorbing resin.

In addition, in this case, a hydrophilic organic solvent may be used, and use amount thereof is not especially limited, but it is, 0 to 10 parts by weight, and more preferably 0 to 5 parts by weight relative to 100 parts by weight of the water-absorbing resin particle. In addition, in mixing the surface cross-linking agent solution into the water-absorbing resin particle, a water-insoluble fine particle powder substance or a surfactant may be present together in a range not to obstruct effect of the present invention, for example in 0 to 10 parts by weight, preferably 0 to 5 parts by weight, more preferably 0 to 1 part by weight. In this case, the water-insoluble fine particle powder substance is not especially limited, and similar kind and amount as in the water-insoluble inorganic particle may be used. In addition, the surfactant to be used and use amount thereof are not especially limited, and similar kind and amount as exemplified in WO 2005/075070 may be used.

After mixing the surface cross-linking agent with the water-absorbing resin, the mixture is subjected to heat treatment and then cooling treatment as needed. In this case, heating temperature of the mixture in this case is not especially limited, as long as it is temperature at which surface cross-linking proceeds, but, 70 to 300° C. is preferable, 120 to 250° C. is more preferable, and 150 to 250° C. is still more preferable, and heating time is preferably within a range of 1 minute to 2 hours. Heating treatment may be performed in a usual dryer or a heating furnace.

It should be noted that, in aiming particularly at hygiene materials (in particular, disposable diapers), by such surface cross-linking, it is enough to enhance absorbency against pressure (AAP) to be described later of the water-absorbing resin after surface cross-linking up to preferably equal to or higher than 20 g/g, and enhance liquid permeation under pressurization (SFC) up to preferably equal to or higher than 10 (unit: $10^{-7} \cdot cm^3 \cdot s \cdot g^{-1}$).

(17) Surface Treatment with the Polyvalent Metal Salt (Surface Cross-Linking with an Inorganic Surface Cross-Linking Agent)

The water-absorbing resin of the present application attains desired water-absorption characteristics, in particular, high liquid permeation characteristics (SFC), by surface treatment with the polyvalent metal salt (other name; the inorganic surface cross-linking agent), that is, by cross-linking the water-absorbing resin by using in combination the polyvalent metal salt and the organic surface cross-linking agent, in particular by surface treatment with the polyvalent metal salt after surface cross-linking with the organic surface cross-linking agent. Also in the relevant step, enhancement and stabilization of property of the water-absorbing resin after the surface cross-linking become possible by storing the water-absorbing resin before the surface cross-linking, in the hopper and further by supplying.

Use amount of the polyvalent metal salt is not especially limited, but it is, in a range of 0 to 5 parts by weight, still more 0.001 to 3 parts by weight, and more preferably 0.01 to 2 parts by weight, relative to 100 parts by weight of the water-absorbing resin.

The polyvalent metal salt to be used is not especially limited, and a water-soluble polyvalent metal salt, for example, aluminum chloride, aluminum polychloride, aluminum sulfate, aluminum nitrate, potassium aluminum bissulfate, sodium aluminum bissulfate, potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, zirconium nitrate or the like may be exemplified. In addition, in view of solubility with an absorbing liquid such as urine, use of a salt having crystal water thereof is preferable.

A particularly preferable one is an aluminum compound. Among this, aluminum chloride, aluminum polychloride, aluminum sulfate, aluminum nitrate, potassium aluminum bissulfate, sodium aluminum bisulfate, potassium alum, ammonium alum, sodium alum, sodium aluminate are preferable, and aluminum sulfate is particularly preferable, and powders of water-containing crystal such as aluminum sulfate-octadeca hydrate salt, aluminum sulfate-tetradeca to octadeca hydrate salt may be used most suitably. They may be used as only one kind, or two or more kinds may be used in combination, and this use amount is in a range of the above-mentioned organic surface cross-linking agent. These polyvalent metal salts may be added to the water-absorbing resin as a powder substance as it is, or may be added in a solution or a water dispersion solution, and in order to add these polyvalent metal salts as the powder substance as it is, the hopper of the present invention may be used suitably.

The polyvalent metal salt is used preferably in a solution state, that is, in a solution state dissolved in water and/or aqueous liquid or various hydrophilic organic solvents and the like, and more preferably in an aqueous solution state. Addition amount of the aqueous liquid or the like composed of water and the hydrophilic organic solvent differs depending on kind or particle size of the water-absorbing resin, and, usually in the case of water, it is in a range of over 0 and equal to or lower than 10 parts by weight, and preferably 1 to 5 parts by weight, relative to 100 parts by weight of solid content of the water-absorbing resin. In addition, amount of the hydrophilic organic solvent to be used is similarly, usually in a range of over 0 and equal to or lower than 10 parts by weight, and preferably 0.1 to 5 parts by weight, relative to 100 parts by weight of solid content of the water-absorbing resin. It should be noted that, temperature of the solution is not especially limited, and setting at a range from freezing point to boiling point, or 20° C. to 100° C. is preferable, and solubility of the polyvalent metal salt may be adjusted by temperature. As for surface treatment with the polyvalent metal salt, it is particularly preferable, in view of water absorption performance (in particular, high liquid permeation), that surface treatment is performed by adding and mixing the polyvalent metal salt after surface cross-linking with the organic surface cross-linking agent.

It should be noted that, a method and condition and the like for surface treatment with the polyvalent metal salt is not especially limited, and has been described, for example, in WO 2004/69915, 2004/113452, and 2005/108472 pamphlet, and the surface treatment methods with the polyvalent metal salts are adopted.

In the production method of the present invention, when additives to be used as needed in the production of the water-absorbing resin, that is, at least two or more kinds selected from a group consisting of the chelating agent, the water-insoluble inorganic particle, the surfactant, the surface cross-linking agent and the polyvalent metal salt are added, it is preferable that the addition amount is controlled within the above range. More preferably, the surface cross-linking agent is used essentially, and this surface cross-linking agent and one selected from a group consisting of the polyvalent metal salt, the chelating agent, the surfactant and the water-insoluble inorganic particle, are combined and added while controlling so that they are within a range of the above addition amount.

It should be noted that, as for the additive components of (7) to (10) and (17), when these additive components are a water-insoluble or water-soluble solid, they may be added as an aqueous solution or a dispersion solution, or may be added as a powder substance. When they are added as the powder substance, it is preferable that the additives are added as the powder where a portion with a particle diameter of equal to or smaller than 1 mm, still more equal to or smaller than 0.3 mm, and in particular, equal to or smaller than 0.15 mm occupies equal to or higher than 90% by weight. In addition, similarly in storage of the water-absorbing resin powder substance, the hopper of the present invention is suitably used for storage of additive components as well.

(18) Other Steps (a Particle Size Adjustment Step after Surface Cross-Linking)

The water-absorbing resin of the present invention may be operated as appropriate as needed, such as a cooling step, and still more a granule sizing step, a granulation step, a fine-powder recovery step, for adjustment to predetermined particle size, after surface cross-linking (surface cross-linking with an organic or inorganic compound). It should be noted that, the step for adjustment to predetermined particle size is not especially limited, and steps described, for example, in USP-A-2004/181031, USP-A-2004/242761, and USP-A-2006/247351 and the like may be adopted. Also in the relevant step, enhancement and stabilization of property of the water-absorbing resin after the surface cross-linking become possible by storing the water-absorbing resin before the surface cross-linking, in the hopper and still more by supplying.

(19) A Filling Step of a Product

The filling step is a step for filling for example, a member for filling such as a container bag or a paper bag with the water-absorbing resin as a final product produced via at least a part of the above steps. The water-absorbing resin packed in the filling member is shipped, for example, after the predetermined inspection is performed. Enhancement and stabilization of property of the water-absorbing resin after filling become possible by storing the water-absorbing resin as a final product in the hopper and still more by filling therewith in a shipping form (bag, box, bottle, silo or the like). A filling unit is determined as appropriate depending on a shipping unit, and it is 100 g to 100 ton (Metric ton), and still more 10 kg to 10 ton.

(20) The Water-Absorbing Resin of the Present Invention

Because the water-absorbing resin obtained by the production method of the present invention has small deflection (variation width relative to desired property value), generation of a product out of specifications (a product out of specifications in a property aspect) can be suppressed and prevented effectively. Here, variation width to property value is not especially limited, but, in consideration of being effectively capable of suppressing and preventing a product out of specifications, it is preferable to be controlled so that 4 times value of the standard deviation of each property to be described later, in particular, at least either of the properties of AAP and CRC is 0 to 5.5% of the average value (arithmetic average) of each property. It is more preferable to be controlled so that 4 times value of the standard deviation ($\sigma$) of each property, in particular, at least either of the properties of AAP and CRC is 0 to 5.0%, and particularly preferably 0 to 4.5% of the average value (arithmetic average) of each property. By control within such a range, a product out of specifications can be effectively suppressed and prevented, and is thus preferable industrially. Still more it is most preferable to control both property values of AAP and CRC so that 4 times value of a standard deviation is in the above range, that is, 0 to 5.0%, and particularly preferably 0 to 4.5% of the average value.

That is, the present invention provides a surface cross-linked polyacrylic acid (salt)-based water-absorbing resin powder substance having a CRC (ERT441.1-02) of 10 to 100 g/g, an AAP (ERT442.2-02, provided that a load is 50 g/cm$^2$) of 15 to 50 g/g, and an SFC, as an index of liquid permeation, of equal to or higher than 1 ($\times 10^{-7} \cdot cm^3 \cdot s \cdot g^{-1}$), preferably equal to or higher than 5 ($\times 10^{-7} \cdot cm^3 \cdot s \cdot g^{-1}$), more preferably equal to or higher than 7 ($\times 10^{-7} \cdot cm^3 \cdot s \cdot ^{-1}$), particularly preferably equal to or higher than 10 ($\times 10^{-7} \cdot cm^3 \cdot s \cdot g^{-1}$), and most preferably equal to or higher than 20 ($\times 10^{-7} \cdot cm^3 \cdot s \cdot g^{-1}$), wherein 4 times value of the standard deviation ($\sigma$) of at least either of the properties of AAP and CRC, preferably both property values is 0 to 5.5% of an average value (arithmetic average) of each property. The water-absorbing resin powder substance of the present invention, where ratio (%) of 4 times value of the standard deviation ($\sigma$) of each property value to average value (arithmetic average) [=(standard deviation)×4/(average value)×100] is 0 to 5.5%, provides stable diapers without property deflection.

It should be noted that, SFC is controlled so that 4 times value of the standard deviation is preferably 0 to 70%, more preferably 0 to 50%, and particularly preferably 0 to 40% of the average value. That is, the present invention provides a surface cross-linked polyacrylic acid (salt)-based water-absorbing resin powder substance having a CRC (ERT441.1-02) of 10 to 100 g/g, an AAP (ERT442.2-02, provided that a load is 50 g/cm$^2$) of 15 to 50 g/g, and an SFC, as liquid permeation, of equal to or higher than 1 ($\times 10^{-7} \cdot cm^3 \cdot s \cdot g^{-1}$), wherein 4 times value of SFC is 0 to 70% of the average value (arithmetic average) of each property. The water-absorbing resin powder substance of the present invention, where ratio (%) of 4 times value of the standard deviation (G) of SFC value to average value (arithmetic average) [=(standard deviation)×4/(average value)×100] is 0 to 70%, provides stable diapers without property deflection.

It should be noted that, the standard deviation and the average value are specified in analysis number "n" of equal to or more than 15, and production of equal to or higher than 15 ton. The upper limit is not especially limited, but, the standard deviation and the average value are specified in a range of, for example, n=1000 (still more, 100) and production of 1000 ton (still more 100 ton). In addition, as for analysis number, analysis may be performed by sampling in a constant interval, for example, by each production amount of 100 kg to 100 ton, and still more 1 ton to 50 ton. Still more, a preferable range of property of the water-absorbing resin, such as CRC, AAP, SFC, is as described later.

In addition, the production method of the present invention is suitably applied to the case where in particular, three or more properties of the water-absorbing resin are controlled. Effect of the control of property is exerted suitably in the production method for the multi-functionalized water-absorbing resin with high properties of such as preferably 4 or more, 5 or more, or 6 or more. As properties which can be controlled, absorbency (CRC), absorbency against pressure (AAP), soluble components (Extractables), free swelling capacity (FSC), residual monomers, particle size distribution, liquid permeation (SFC), pH, moisture content, flow rate, density, respirable particles, dust and the like are included, and they are applicable to a production method for highly controlling these. The properties to be controlled or the methods for measuring them may be determined as appropriate, and the EDANA measuring methods and the like are applicable to the production of the water-absorbing resin with the property in the following range.

Here, "CRC" (ERT441.2-02), as absorbency after centrifugal separation, is in a range of preferably 10 to 100 g/g, more preferably 20 to 60 g/g, and particularly preferably 25 to 50 g/g. In addition, "AAP" (in ERT442.2-02, the load is changed to 50 g/cm$^2$) is in a range of preferably 15 to 50 g/g, more preferably 18 to 45 g/g, and particularly preferably 20 to 45 g/g. SFC is in a range of preferably equal to or higher than 10 (unit: $10^{-7} \cdot cm^3 \cdot s \cdot g^{-1}$), still more 20 to 1000 (unit: $10^{-7} \cdot cm^3 \cdot s \cdot g^{-1}$), and 30 to 500 (unit: $10^{-7} \cdot cm^3 \cdot s \cdot g^{-1}$). Here, AAP, CRC and SFC are in contradiction tendency, but, when they are in the above range, the water-absorbing resin with these properties balanced can be provided.

Water-soluble "Extractables" are preferably equal to or lower than 30% by weight, more preferably equal to or lower than 20% by weight, and particularly preferably equal to or lower than 10% by weight. FSC (free swelling capacity) is in a range of preferably 10 to 100 g/g, more preferably 20 to 60 g/g, and particularly preferably 30 to 50 g/g. It is preferable that particle size distribution is similar as described in above (15). SFC as liquid permeation is preferably equal to or higher than 1, more preferably equal to or higher than 10, and particularly preferably equal to or higher than 25 (unit: $\times 10^{-7} \cdot cm^3 \cdot s \cdot g^{-1}$). It should be noted that, the upper limit of SFC is not especially limited, because the higher is the better, but it is, in general, about 1000 (unit: $\times 10^{-7} \cdot cm^3 \cdot s \cdot g^{-1}$), and more preferably about 500 (unit: $\times 10^{-7} \cdot cm^3 \cdot s \cdot g^{-1}$). Residual monomers is preferably equal to or lower than 500 ppm by weight, more preferably equal to or lower than 300 ppm by weight, and particularly preferably equal to or lower than 100 ppm by weight. In addition, the additives, for example, the chelating agent or the inorganic fine particle or the like is included in the above range. Because the present invention is capable of controlling such many properties at the same time, stably and highly, it can be used suitably in producing, in particularly, continuously producing the water-absorbing resin of the above range.

The water-absorbing resin produced by the production method of the present invention is not especially limited as for size thereof or the like. Usually, the water-absorbing resin produced by the production method of the present invention has mass average particle diameter (D50) of 100 to 1000 μm, preferably 150 to 850 μm, more preferably 200 to 700 μm, and particularly preferably 200 to 600 μm. In addition, the lower particles below 150 μm is the better, and content of the particles below 150 μm is usually adjusted at 0 to 20% by weight, preferably 0 to 15% by weight, more preferably 0 to 10% by weight, and particularly preferably from 0 to 5% by weight. Still more, the lower particles of equal to or larger than 850 μm is the better, and content of the particles of equal to or larger than 850 μm is usually adjusted at 0 to 3% by weight, and preferably substantially 0% by weight. That is, the water-absorbing resin produced by the production method of the present invention has ratio of particles with the mass average particle diameter (D50) of 850 to 150 μm of preferably equal to or higher than 95% by weight (the upper limit is 100% by weight), more preferably equal to or higher than 96% by weight (the upper limit is 100% by weight), and particularly preferably equal to or higher than 97% by weight (the upper limit is 100% by weight). Logarithm standard deviation (σζ) of particle size distribution is set at preferably equal to or lower than 0.8, preferably equal to or lower than 0.6, further preferably 0.2 to 0.5, and particularly preferably 0.20 to 0.40. These measurement methods using standard sieves, for example, have been described in WO 2004/069915 or EDANA-ERT420.2-02.

EXAMPLES

Production Example 1 of the Water-Absorbing Resin Powder

The water-absorbing resin powder was produced continuously by using a continuous production apparatus (a production capacity of about 1500 kg per one hour) of the water-absorbing resin, which is capable of performing each step continuously and is composed by being connected with the polymerization step (static polymerization on a belt), the gel grain refining (crushing) step, the drying step, the pulverization step, the classification step, the surface cross-linking step (a spray step and a heating step of the surface cross-linking agent), the cooling step, the granule sizing step, and the transportation step between each step.

Specifically, as a monomer aqueous solution (1), an aqueous solution of a partial sodium salt of acrylic acid with 75% by mole neutralized (concentration: 38% by weight), containing 0.06% by mole (relative to the monomer) of polyethylene glycol diacrylate (average number of n=9, which is average polymerization degree) as an internal cross-linking agent, was fed continuously with a metering pump, and by blowing nitrogen gas continuously in the midway of a transportation pipeline, oxygen concentration was adjusted to equal to or lower than 0.5 ppm.

Next, to the monomer aqueous solution (1), sodium persulfate and L-ascorbic acid were further mixed continuously with a line mixer, in amount of 0.14 (g) and 0.005 (g) respectively (relative to 1 mole of the monomer), to supply to a flat surface steel belt having weirs at both ends thereof, so that thickness thereof became about 30 mm, and static aqueous solution polymerization was performed continuously for 30 minutes. A water-containing gel-like cross-linked polymer (2) obtained in this way was segmentalized to about 1 mm by use of a meat chopper with a pore diameter of 7 mm, and this was spread and mounted on a moving porous plate of a continuous air-flow band dryer to a thickness of 50 mm, to be subjected to drying at 185° C. for 30 minutes to obtain a dried polymer.

Whole mass of the relevant dried polymer was continuously supplied to a three-stage roll mill (roll gap configuration was from the top, 1.0 mm/0.55 mm/0.42 mm) to be pulverized; next it was classified by use of a sieve classification apparatus having metal meshes with mesh sizes of 850 µm and 150 µm to obtain water-absorbing resin powder (3) (CRC=36 g/g), wherein about 98% by weight thereof had a particle diameter of 850 µm to 150 µm. It should be noted that, moisture content of this water-absorbing resin powder (3) was 3.5% by weight. Mass average particle diameter (D50) of this water-absorbing resin powder (3) was 450 µm, and content of particles below 150 µm was 0.9% by weight, and content of particles equal to or larger than 850 µm was 0.1% by weight. Logarithm standard deviation (σζ) of particle size distribution of the water-absorbing resin powder (3) was 0.39.

Example 1

After storing the water-absorbing resin powder (3) obtained in the Production Example 1, for 2 hours, in a hopper (an intermediate hopper) with a caliber of the discharge exit of 1 m, a drawing rate of 50%, an inclination angle of a cone part of 70 degree and an internal volume of 8 m³, while performing the storage, it was continuously and quantitatively supplied in 1500 kg/hr to a high speed continuous mixing machine (Turbulizer, 1000 rpm), with a metering supplying machine (a table feeder) installed at the discharging part, and the surface treatment agent solution, as a mixed solution composed of 0.3 part by weight of 1,4-butanediol, 0.5 part by weight of propylene glycol and 2.7 parts by weight of pure water relative to 100 parts by weight of the water-absorbing resin, was mixed thereto by spraying with a sprayer. Amount of the water-absorbing resin powder remaining in the hopper in a normal state was 3000 kg, which corresponded to a filling rate with the water-absorbing resin powder of 62.5% by volume. In addition, moisture content of the water-absorbing resin powder remaining in the hopper was 3.5% by weight.

It should be noted that, the hopper used in Example was a heat retained state at 60° C., and degree of reduced pressure inside thereof was 0.3 kPa. In addition, surface roughness Ra inside thereof was 19.5 nm, and Rz was 138.1 nm.

Next, the resultant mixture was subjected to heat treatment continuously at 198° C. for 40 minutes with a paddle dryer. After that, it was forced to cool down to 60° C. by use of a similar paddle dryer (the cooling step). Still more, a substance having passed 850 µm was classified by using a sieve classification apparatus, and a product remaining on the mesh with a mesh size of 850 µm was pulverized again, and mixed with the substance having passed 850 µm, to obtain the water-absorbing resin (A) as a granule sized product, where the whole amount was the substance having passed 850 µm. The resultant water-absorbing resin (A), produced for 12 hours of production, was stored in a hopper (a product hopper) with a caliber of the discharge exit of 1.5 m, a drawing rate of 40%, an inclination angle of a cone part of 68 degree and an internal volume of 40 m³, and provided with a knife gate at the discharging part. Amount of storage for 12 hours was 18 ton. This 18 ton of a product was packed over 2 hours in container bags each with a volume of 1 ton. In this case, sampling was performed by each packing in the container bag with a volume of 1 ton, to perform performance measurement of the water-absorbing resin for 18 ton. Sample number obtained was 18, and average CRC, AAP and SFC were 29.8, 24.7 and 33, respectively, and standard deviations were 0.28, 0.27 and 2.91, respectively. Detailed performance is shown in Table 1.

Comparative Example 1

After storing the water-absorbing resin powder (3), obtained in the Production Example 1, for 2 hours, in a hopper with a caliber of the discharge exit of 1 m, a drawing rate of 50%, an inclination angle of a cone part of 35 degree and an internal volume of 8 m³, while performing the storage continuously, it was continuously and quantitatively supplied in 1500 kg/hr to a high speed continuous mixing machine (Turbulizer, 1000 rpm), with a metering supplying machine (a table feeder) installed at the discharging part, and the surface treatment agent solution, as a mixed solution composed of 0.3 part by weight of 1,4-butanediol, 0.5 part by weight of propylene glycol and 2.7 parts by weight of pure water relative to 100 parts by weight of the water-absorbing resin, was mixed by spraying with a sprayer. Amount of the water-absorbing resin powder remaining in the hopper in a normal state was 3000 kg, which corresponded to a filling rate with the water-absorbing resin powder of 62.5% by volume. In addition, moisture content of the water-absorbing resin powder remaining in the hopper was 3.5% by weight.

It should be noted that, degree of reduced pressure inside the hopper used in Comparative Example was 0 kPa. In addition, surface roughness Ra inside thereof was 300 nm, and Rz was 1500 nm.

Next, the resultant mixture was subjected to heat treatment continuously at 198° C. for 40 minutes with a paddle dryer. After that, it was forced to cool down to 60° C. by using a similar paddle dryer (the cooling step). Still more, a substance having passed 850 µm was classified by using a sieve classification apparatus, and a product remaining on the mesh with a mesh size of 850 µm was pulverized again, and mixed with the substance having passed 850 µm, to obtain the water-absorbing resin (B) as a granule sized product, where the whole amount was the substance having passed 850 µm. The resultant water-absorbing resin (B), produced for 12 hours of production, was stored in a hopper with a caliber of the discharge exit of 0.5 m, a drawing rate of 13%, an inclination angle of a cone part of 32 degree and an internal volume of 40 m³, and provided with a knife gate at the discharging part. Amount of storage for 12 hours was 18 ton. This 18 ton of a product was packed over 2 hours in container bags each with a volume of 1 ton. In this case, sampling was performed by each packing in the container bag with a volume of 1 ton, to perform performance measurement of the water-absorbing resin for 18 ton. Sample number obtained was 18, and average CRC, AAP and SFC were 29.8, 24.5 and 30, respectively, and standard deviations were 0.49, 0.43 and 7.07, respectively. Detailed performance is shown in Table 2.

Comparative Example 2

Similar operation was performed as in Comparative Example 1, except that after storing the water-absorbing resin powder (3), obtained in the Production Example 1, for 2 hours, in a hopper with a caliber of the discharge exit of 0.5 m, a drawing rate of 10%, an inclination angle of a cone part of 30 degree and an internal volume of 8 m³, while performing the storage continuously, it was continuously and quantitatively supplied in 1500 kg/hr to a high speed continuous mixing machine (Turbulizer, 1000 rpm), with a metering supplying machine (a table feeder) installed at the discharging part.

Next, sampling of the resulting water-absorbing resin was performed, similarly as in Comparative Example 1, by each packing in the container bag with a volume of 1 ton to perform performance measurement of the water-absorbing resin for 18 ton. Sample number obtained was 18, and average CRC, AAP and SFC were 29.8, 24.2 and 27, respectively, and standard deviations were 0.82, 0.67 and 8.27, respectively. Detailed performance is shown in Table 2.

[Evaluation]

By using the 18 pieces of water-absorbing resin powder sampled each in Example 1 along with Comparative Examples 1 and 2, absorbing articles described in Example 1 of EP No. 884037 were prepared to perform evaluation of absorbing bodies as disposable diapers. It should be noted that, in the evaluation of the present application, the same operation as in Example 1 of EP No. 884037 was performed except that 50 ml of a normal saline solution was charged 6 times in total in an interval of 20 minutes. That is, after charging total 300 ml to the disposable diapers prepared each, presence or absence of leakage from the disposable diapers was evaluated.

As a result, there was observed no leakage in all of 18 disposable diapers where the water-absorbing resin powder of Example 1 was used. On the other hand, leakage was confirmed in one of 18 disposable diapers where the water-absorbing resin powder of Comparative Example 1 was used. In addition, leakage was confirmed in two of 18 disposable diapers where the water-absorbing resin powder of Comparative Example 2 was used.

It can be used, for example, in water-absorbing and water retention agent for absorbing articles such as disposable diapers, sanitary napkins, incontinent pads, medical pads or the like; water-retention agent for agriculture and gardening such as a bog mass substitute, a soil modification and improvement agent, a water-retention agent, an effect sustaining agent of agricultural chemicals or the like; water-retention agent for construction such as a dew condensation prevention agent for interior walls, cement additives or the like; a release control agent, a refrigerant, disposable pocket warmers, a sludge coagulating agent, freshness retaining agents for foods, an ion exchanging column material, a dehydrating agent for sludge or oil, a drying agent, a humidity adjustment agent or the like.

In addition, the water-absorbing resin of the present invention is used particularly suitably in absorbing hygiene materials for excrement, urine or blood such as disposable diapers, sanitary napkins and the like.

The invention claimed is:

1. A production method for a water-absorbing resin, comprising:
    polymerizing an acrylic acid aqueous solution to obtain a water-containing gel;
    drying the water-containing gel to obtain a dried substance;
    pulverizing and classifying the dried substance to obtain a powder substance; and
    surface cross-linking of the powder substance,
    wherein including and subsequent to the drying step, after storing the dried substance or the powder substance in a hopper having an inclination angle of a cone part of 65-85 degree, and a drawing rate of 30 to 80%, at least one or more places, the dried substance or the powder substance is discharged.

TABLE 1

| | Example 1 | | | | Comparative Example 1 | | | | Comparative Example 2 | | |
|---|---|---|---|---|---|---|---|---|---|---|---|
| Sample No. | CRC (g/g) | AAP (g/g) | SFC ($\times 10^{-7}$ cm$^3 \cdot$ s $\cdot$ g$^{-1}$) | Sample No. | CRC (g/g) | AAP (g/g) | SFC ($\times 10^{-7}$ cm$^3 \cdot$ s $\cdot$ g$^{-1}$) | Sample No. | CRC (g/g) | AAP (g/g) | SFC ($\times 10^{-7}$ cm$^3 \cdot$ s $\cdot$ g$^{-1}$) |
| 1 | 30.0 | 24.2 | 32 | 1 | 29.0 | 23.9 | 35 | 1 | 29.3 | 23.9 | 30 |
| 2 | 29.9 | 24.4 | 29 | 2 | 30.5 | 25.0 | 20 | 2 | 31.0 | 25.1 | 15 |
| 3 | 29.7 | 25.0 | 32 | 3 | 29.5 | 24.2 | 38 | 3 | 28.7 | 23.5 | 39 |
| 4 | 30.5 | 24.8 | 30 | 4 | 29.7 | 24.7 | 32 | 4 | 29.6 | 23.9 | 29 |
| 5 | 29.6 | 24.9 | 36 | 5 | 29.5 | 24.7 | 36 | 5 | 29.4 | 23.8 | 31 |
| 6 | 29.7 | 24.5 | 36 | 6 | 29.6 | 24.9 | 36 | 6 | 29.8 | 24.2 | 30 |
| 7 | 30.0 | 24.8 | 27 | 7 | 30.3 | 24.9 | 27 | 7 | 30.6 | 24.5 | 24 |
| 8 | 29.6 | 24.4 | 35 | 8 | 30.3 | 23.8 | 35 | 8 | 30.4 | 24.5 | 26 |
| 9 | 29.8 | 25.1 | 37 | 9 | 29.3 | 24.6 | 37 | 9 | 29.0 | 23.2 | 35 |
| 10 | 29.5 | 24.6 | 33 | 10 | 29.7 | 24.2 | 33 | 10 | 29.8 | 24.1 | 30 |
| 11 | 29.6 | 24.2 | 36 | 11 | 29.8 | 24.1 | 36 | 11 | 29.4 | 23.8 | 32 |
| 12 | 29.2 | 24.4 | 31 | 12 | 29.8 | 23.9 | 31 | 12 | 29.3 | 23.5 | 35 |
| 13 | 29.8 | 24.7 | 31 | 13 | 29.8 | 24.9 | 31 | 13 | 29.1 | 23.2 | 28 |
| 14 | 29.8 | 24.9 | 31 | 14 | 30.8 | 24.8 | 15 | 14 | 31.5 | 25.4 | 10 |
| 15 | 30.2 | 24.9 | 33 | 15 | 29.5 | 24.9 | 29 | 15 | 31.0 | 25.1 | 15 |
| 16 | 29.8 | 24.6 | 32 | 16 | 29.9 | 24.6 | 28 | 16 | 29.4 | 24.2 | 26 |
| 17 | 29.9 | 24.8 | 36 | 17 | 29.9 | 24.5 | 30 | 17 | 29.1 | 24.1 | 30 |
| 18 | 30.0 | 24.9 | 29 | 18 | 30.8 | 24.8 | 15 | 18 | 30.7 | 25.1 | 12 |
| Arithmetic Average | 29.8 | 24.7 | 33 | Arithmetic Average | 29.9 | 24.5 | 30 | Arithmetic Average | 29.8 | 24.2 | 27 |
| Standard Deviation | 0.28 | 0.27 | 2.91 | Standard Deviation | 0.49 | 0.43 | 7.07 | Standard Deviation | 0.82 | 0.67 | 8.27 |

Industrial Applicability

The water-absorbing agent relevant to the present invention, along with the water-absorbing resin obtained by the production method of the water-absorbing agent are superior in balance of absorbency (CRC, AAP) and liquid permeability under pressurization (SFC), and can be produced stably, and therefore it can be used as the water-absorbing resin in various applications.

2. The production method for a water-absorbing resin according to claim 1, wherein a shape of the hopper is an inverse circular truncated cone shape or an inverse truncated pyramid shape.

3. The production method according to claim 1, wherein the drawing rate of the hopper is 35 to 80%.

4. The production method according to claim 1, wherein a material of the hopper is stainless steel, and surface roughness (Rz) of the inner surface of the hopper is equal to or smaller than 800 nm.

5. The production method according to claim 1, wherein the powder substance is a water-absorbing resin powder.

6. The production method according to claim 1, wherein the hopper is installed between a step for pulverizing and classifying the dried substance, and a step for surface crosslinking the powder substance after classification.

7. The production method according to claim 1, wherein the hopper is installed at two or more places.

8. The production method according to claim 1, wherein the hopper is heated or retains heat.

9. The production method according to claim 1, wherein the powder substance is heated or retains heat.

10. The production method according to claim 1, wherein residence time of the powder substance in the hopper is controlled within 24 hours.

11. The production method according to claim 1, wherein filling rate with the powder substance in the hopper is controlled at equal to or lower than 90% by volume.

12. The production method according to claim 1, wherein internal volume of the hopper is 1 to 100 $m^3$.

13. The production method according to claim 1, wherein moisture content of the water-absorbing resin is 0.5 to 20% by weight.

14. The production method according to claim 1, further comprising a step for adding a polyvalent metal salt or a hydroxide.

15. The production method according to claim 1, further comprising a step for adding a water-insoluble inorganic particle.

16. The production method according to claim 1, further comprising a step for adding a chelating agent.

17. The production method according to claim 1, further comprising a step for adding a surfactant.

18. The production method according to claim 1, wherein the water-absorbing resin has a mass average particle diameter (D50) of 200 to 600 μm, a ratio of particles of a 850 μm diameter to particles of a 150 μm diameter being equal to or higher than 95% by weight, and a logarithm standard deviation (σξ) of 0.20 to 0.40.

19. The production method according to claim 1, wherein the water-absorbing resin has a CRC (ERT441.1-02) of 10 to 100 g/g, an AAP (ERT442.2-02, provided that a load is 50 $g/cm^2$) of 15 to 50 g/g, also a water-extractable content of equal to or lower than 30% by weight, an SFC, which is liquid permeation, of equal to or higher than 1 (unit: $10^{-7} \cdot cm^3 \cdot s \cdot g^{-1}$), and residual monomers of equal to or lower than 500 ppm by weight.

20. The production method according to claim 1, wherein 4 times value of a standard deviation (σ) of at least either of the properties of AAP (ERT442.2-02, provided that a load is 50 $g/cm^2$) and CRC (ERT441.1-02) is 0 to 5.5% of an average value (arithmetic average) of the property provided that the standard deviation and the average value are specified by that analysis number "n" of equal to or more than 15, and production of equal to or higher than 15 ton.

21. The production method according to claim 1, wherein it is a continuous production method of equal to or higher than 0.5 t/hr per one line.

* * * * *